(12) United States Patent
Oshita et al.

(10) Patent No.: US 8,032,569 B2
(45) Date of Patent: Oct. 4, 2011

(54) INFORMATION MANAGEMENT SYSTEM, DISPLAY SYSTEM, MANAGEMENT APPARATUS AND PROGRAM

(75) Inventors: Yasuo Oshita, Nagano-ken (JP);
Hidetsugu Obi, Nagano-ken (JP);
Hideki Matsuda, Nagano-ken (JP);
Yoshiyuki Kodama, Nagano-ken (JP);
Junji Ajioka, Nagano-ken (JP); James Dawson, New York, NY (US); Michael Claypool, New York, NY (US);
Christine Prentice, Brooklyn, NY (US);
John Reaves, New York, NY (US)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 12/115,759

(22) Filed: May 6, 2008

(65) Prior Publication Data

US 2009/0006477 A1   Jan. 1, 2009

Related U.S. Application Data

(60) Provisional application No. 60/946,875, filed on Jun. 28, 2007.

(51) Int. Cl.
*G06F 17/30* (2006.01)

(52) U.S. Cl. ........................................................ 707/821

(58) Field of Classification Search .................... 707/821
See application file for complete search history.

(56) References Cited

U.S. PATENT DOCUMENTS

2002/0002468 A1 *  1/2002  Spagna et al. ..................... 705/1
2007/0043805 A1 *  2/2007  Izaki et al. ..................... 709/201

FOREIGN PATENT DOCUMENTS

JP            2001222525            8/2001

* cited by examiner

*Primary Examiner* — Kuen Lu
*Assistant Examiner* — Truong Vo

(57) ABSTRACT

Only the display device stores content files and a management device stores file management information. The content files are managed using the file management information. Because the management device does not store the actual content files, the security policy of an organization is not violated even if the management device is located outside the organization. Furthermore, because the display device stores the content files, the user desire to keep content files locally at hand is satisfied. Furthermore, because file management information consisting of small amounts of data is exchanged between the display system and the management device, the communication environment of the system does not need to be suitable to large data transmissions. Furthermore, because the management device stores the file management information, the storage capacity required by the management device is small.

14 Claims, 16 Drawing Sheets

```
1  <docs>
2      <key>DocID</key><integer>392</integer>
3      <key>DocTitle</key><string>Response: Motion to Suppress Evidence</string>
4      <key>Author</key><string>Michael Claypool</string>
5      <key>Recipient</key><string></string>
6      <key>CC/BCC</key><string></string>
7      <key>DocDate</key><string>11/01/2006</string>
8      <key>DateAdded</key><string>11/20/2006</string>
9      <key>DocType</key><string>DOC</string>
10     <key>FileName</key><string>Response_To_Motion_v3.0</string>
11     <key>Size</key><integer>440611</integer>
12     <key>BeginningBates</key><integer>XYZ00171911</integer>
13     <key>EndBates</key><integer>XYZ00171914</integer>
14     <key>Flag</key><integer>1;2</integer>
15     <key>SourceFileLocation</key><integer>j:summation/1001/001/001/002/</integer>
16     <key>SourceFileName</key><integer>Response_To_Motion_v3.0.doc</integer>
17     <key>SourceFileIdentifier</key><integer>XCB445F72S221</integer>
18     <key>Private</key><integer>N</integer>
19     <key>Annotation</key><string>This our response to the motion filed on 11.21.06</string>
20     <key>NewDocument</key><integer>N</integer>
21     <key>LastViewedDate</key><integer>12/01/2006</integer>
22     <key>Location</key><string>//localhost/dPad/20061120/Response_Motion_v3.0.PDF</string>
23
24 </docs>
25
26
27 <collection>
28     <key>Name<key><string>IBM Litigation</string>
29     <key>CollectionID</key><integer>1000</integer>
30         <array>
31            <docs>
32               <key>DocID</key><integer>392</integer>
33            </docs>
34            <docs>
35               <key>DocID</key><integer>400</integer>
36            </docs>
37            <docs>
38               <key>DocID</key><integer>389</integer>
39            </docs>
40            <docs>
41               <key>DocID</key><integer>393</integer>
42            </docs>
43            <docs>
44               <key>DocID</key><integer>395</integer>
45            </docs>
46
47         </array>
48 </collection>
```

INFORMATION MANAGEMENT SYSTEM, DISPLAY SYSTEM, MANAGEMENT APPARATUS AND PROGRAM

CROSS-REFERENCE TO RELATED APPLICATIONS

This application claims the benefit of U.S. Provisional Application Ser. No. 60/946,875, filed on Jun. 28, 2007, the contents of which are incorporated herein by reference.

BACKGROUND

1. Field of Invention

The present invention relates to technology for managing documents, images, and other types of information.

2. Description of Related Art

Information management systems that are known by names such as content management systems (CMS), document management systems (DMS), and digital asset management (DAM) systems are used by corporations and other organizations for managing massive amounts of information including documents and images. One reason that such information management systems have attracted attention is that the need to efficiently manage a flood of information in corporations has become acute. Another major factor is the emphasis on sharing information within a corporation and between companies in a corporate group.

Civil litigation in the United States, for example, involves a process called "discovery," a system that requires documents that are required as evidence to be provided to the other party. To comply with this system of discovery, many law firms in the United States have introduced information management systems for handling different types of documents as easily searchable digital data.

The information that is handled by an organization and the purposes for which the information is managed vary widely between organizations, and information management systems are therefore ideally built to the particular specifications of the individual organization. Such custom-built management systems are, however, expensive to develop. Therefore, while large corporations have steadily introduced such information management systems, many small and medium-size corporations have yet to deploy such information management systems. Because it is difficult for small and medium-size corporations to provide the human resources and new dedicated facilities required to build such systems, building a system with the lowest possible overhead is desirable. Japanese Patent Publication JP 2001-222525, for example, teaches a method of managing confidential documents for different corporations on a single server system that is managed by a third-party contractor that contracts individually with each of the corporations.

SUMMARY OF INVENTION

However, sending confidential corporate documents to a server located at an outside company is often not permitted by corporate security policies, and it is expected that very few corporations will use the method taught in Japanese Patent Publication JP 2001-222525.

There is also the desire of individual corporate employees to keep confidential documents and other very important information locally, and the method taught in Japanese Patent Publication JP 2001-222525 thus also contravenes this natural desire of individual employees.

In addition, the method taught in Japanese Patent Publication JP 2001-222525 requires that all confidential documents be sent to the server from the terminals used by the individual employees. However, the communication environment including the available communication bandwidth and the communication speed of the individual terminals is not necessarily suited to large data transfers.

Furthermore, as the number of corporations that use this document storage service increases, the storage capacity required by the server described in Japanese Patent Publication JP 2001-222525 increases. This increase in storage capacity thus increases the burden on the server administration side.

As described above, a first problem of the method taught in Japanese Patent Publication JP 2001-222525 is that it violates common corporate security policies. A second problem is that sending information from a local server or terminal to a remote system goes against the desires of individual employees. A third problem is that the communication environment of the terminals used by individual employees is not always suited to transmitting large volumes of data, and a fourth problem is that the burden on the system administrator is increased by the increase in the required server storage capacity.

An object of the present invention is to provide an information management system that can solve these problems.

To solve the foregoing problem the invention provides an information management system comprising a plurality of display devices that displays information, a plurality of communication devices that connect by wire or wirelessly to individual display devices, and a management device that is connected through a network to the individual communication devices, wherein the management device includes a management information storage unit that stores management information for managing the information, a first transmission unit that sends the management information stored by the management information storage unit to the communication device, a management information updating unit that updates the management information stored by the management information storage unit according to a command from the communication device, and a second transmission unit that sends the management information updated by the management information updating unit according to the command from the communication device through the communication device to the display device; the communication device includes an operating unit that receives user operations, and a control unit that changes the management information sent by the first transmission unit of the management device according to the operation received by the operating unit, and instructing the management device to update the management information to the changed content; and the display device includes an information storage unit that relates and stores the information and the management information for managing the information, a display unit that displays the information stored by the information storage unit, an updating unit that updates management information stored by the information storage unit based on management information sent by the second transmission unit of the management device, and a management unit that manages the various information stored by the information storage unit using the management information stored by the information storage unit.

The management information may contain hierarchical relationship information representing a hierarchical relationship between various information, and the management unit of the display device displays an identification name assigned to information corresponding to the various management information according to the hierarchical relationship described by the hierarchical relationship information contained in the various management information.

The management information may contain metadata for the information, and the management unit of the display device displays identification names that are grouped according to the information correlated to the management information containing common metadata and are assigned to the information.

The metadata may contain additional information that is added to the information, and the management unit of the display device displays identification names that are grouped according to the information correlated to the management information containing common additional information and are assigned to the information.

Further alternatively, the communication device includes an information display unit that gets and displays the information stored by the information storage unit of the display device, a generating unit that changes information displayed by the information display unit according to operations received by the operating unit and generates the management information according to the changed information content, a management information transmission unit that sends the management information generated by the generating unit to the management device, and instructs the management device to update to the content of the transmitted management information, and an information transmission unit that sends the information of content changed by and the management information generated by the generating unit to the display device when communication with the display device is possible, and stores the information of content changed by and the management information generated by the generating unit when communication with the display device is not possible, and then sends the stored information and management information to the display device when communication with the display device later becomes possible; and the updating unit of the display device updates information and management information stored by the information storage unit based on information and management information sent by the information transmission unit of the communication device.

Alternatively, the display device includes a management information transmission unit that sends the management information stored by the information storage unit through the communication device to the management device when connected to the communication device; and the management device includes an identification unit that compares management information sent from the management information transmission unit of the display device and the management information stored by the management information storage unit, and identifies differences in the information, and a third transmission unit that sends the differences identified by the identification unit through the communication device to the display device; and the updating unit of the display device updates management information stored by the information storage unit based on the differences sent by the third transmission unit of the management device.

Alternatively, the information management system also has a control device that commands the management device to update content of the management information stored by the management information storage unit of the management device, and the management information updating unit of the management device updates the management information stored in the management information storage unit according to a command from the control device, and the second transmission unit of the management device sends the management information updated by the management information updating unit according to the command from the control device through the communication device to the display device.

Alternatively, display device and the management device each store a first key for encrypting the management information that is transferred between the display device and the management device; the display device stores a second key for encrypting the information and the management information that is transferred between the display device and the communication device; the management information is encrypted or the encrypted management information is decrypted using the first key stored by the display device and the management device when the management information is transferred between the display device and the management device; and when the information or the management information is transferred between the display device and the communication device, the display device sends the stored second key to the communication device before the transfer, the information or the management information is encrypted, or the encrypted information or management information is decrypted, using the second key stored by both the display device and the communication device after the display device and the communication device have each stored the second key, and the communication device deletes the stored second key after encryption or decryption by the communication device is completed.

Alternatively, the display device and the management device store a different first key for each user that uses the display device.

Alternatively, the communication device includes an acquisition unit that acquires various information and identification names identifying the various information, a management information generating unit that merges the information and identification names acquired by the acquisition unit into a single unit of merged information, and generating management information for the merged information, and an information transmission unit that relates and sends to the display device the merged information that was merged by the management information generating unit and the management information generated by the management information generating unit; the display device includes a storage control unit that receives, relates, and stores in the information storage unit the merged information and the management information sent by the information transmission unit of the communication device; and the display unit of the display device displays the identification names contained in the merged information stored in the information storage unit, and when a displayed identification name is specified by an operation received by the operating unit, displays the information that is identified by the specified identification name in the information contained in the merged information.

Alternatively, the communication device includes a conversion unit that converts the merged information to a prescribed data format compatible with the display device; and the information transmission unit sends the merged information after data format conversion by the conversion unit to the display device.

Alternatively, the communication device includes an acquisition unit that acquires various information and identification names identifying the various information, a management information generating unit that generates management information for the various information acquired by the acquisition unit, and an information transmission unit that relates and sends to the display device the management information generated by the management information generating unit and the identification names and the information acquired by the acquisition unit; the display device includes a storage control unit that receives, relates, and stores in the information storage unit the various identification names, the various information, and the various management information sent by the information transmission unit of the communication device; and the display unit of the display device displays the identification names stored by the information storage unit, and when a displayed identification name is specified by an operation received by the operating unit, displays the information that is linked to the identification name and stored by the information storage unit.

Alternatively, the communication device includes a conversion unit that converts the information and the identification names to a prescribed data format compatible with the display device; and the information transmission unit sends the information and the identification names after data format conversion by the conversion unit to the display device.

Alternatively, the acquisition unit acquires the information and the identification names as a search result based on search conditions specified by an operation received by the operating unit.

The invention also provides a display system comprising a display device that displays information, and a communication device that connects by wire or wirelessly to the display device, wherein: the communication device includes an operating unit that receives user operations; and a control unit that changes management information sent from an external management device according to an operation received by the operating unit, and instructs the management device to update the management information to the changed content; and the display device includes an information storage unit that relates and stores the information and the management information that manages the information, a display unit that displays the information stored by the information storage unit, an updating unit that updates management information stored by the information storage unit based on management information sent from the management device, and a management unit that manages the various information using the management information stored by the information storage unit.

Alternatively, the management information contains hierarchical relationship information representing a hierarchical relationship between various information; and the management unit of the display device displays an identification name assigned to information corresponding to the various management information according to the hierarchical relationship described by the hierarchical relationship information contained in the various management information.

Alternatively, the management information contains metadata for the information; and the management unit of the display device displays identification names that are grouped according to the information correlated to the management information containing common metadata and are assigned to the information.

Alternatively, the metadata contains additional information that is added to the information; and the management unit of the display device displays identification names that are grouped according to the information correlated to the management information containing common additional information and are assigned to the information.

The invention also provides a management device that has a management information storage unit that stores management information that manages the information stored by the display system described above; a first transmission unit that sends the management information stored in the management information storage unit to the display system; a management information updating unit that updates the management information stored by the management information storage unit according to commands from the display system; and a second transmission unit that sends the management information updated by the management information updating unit according to a command from the display system to the display system.

The invention also provides computer readable storage medium having instructions that causes a computer to function as: a management information storage unit that stores management information that manages the information stored by the display system described above; a first transmission unit that sends the management information stored in the management information storage unit to the display system; a management information updating unit that updates the management information stored by the management information storage unit according to commands from the display system; and a second transmission unit that sends the management information updated by the management information updating unit according to a command from the display system to the display system.

Because the management device does not store the actual information, the invention does not contravene security policies that prohibit sending the information of an organization to a location outside the organization even if the management device is located outside the organization.

Furthermore, because a display system that is operated by the user stores the information, the invention satisfies the user desire to keep information locally.

Furthermore, because management information that is smaller than the actual information is sent and received between the display system and the management device with the invention, it is not a great problem if the communication environment of the display system that is operated by the user is not suited to transmitting large amounts of data.

Furthermore, because the management device stores management information that contains less data than the actual information being managed, the management device requires less storage capacity than if the management device stored the information being managed.

BRIEF DESCRIPTION OF THE DRAWINGS

FIG. 4 shows an example of file management information according to the same embodiment.

FIG. 9 continues to FIG. 10.

FIG. 10 continues to FIG. 11.

FIG. 11 continues to FIG. 12.

DESCRIPTION OF THE PREFERRED EMBODIMENTS

Preferred embodiments of the invention are described next with reference to the figures.

Figure 1:
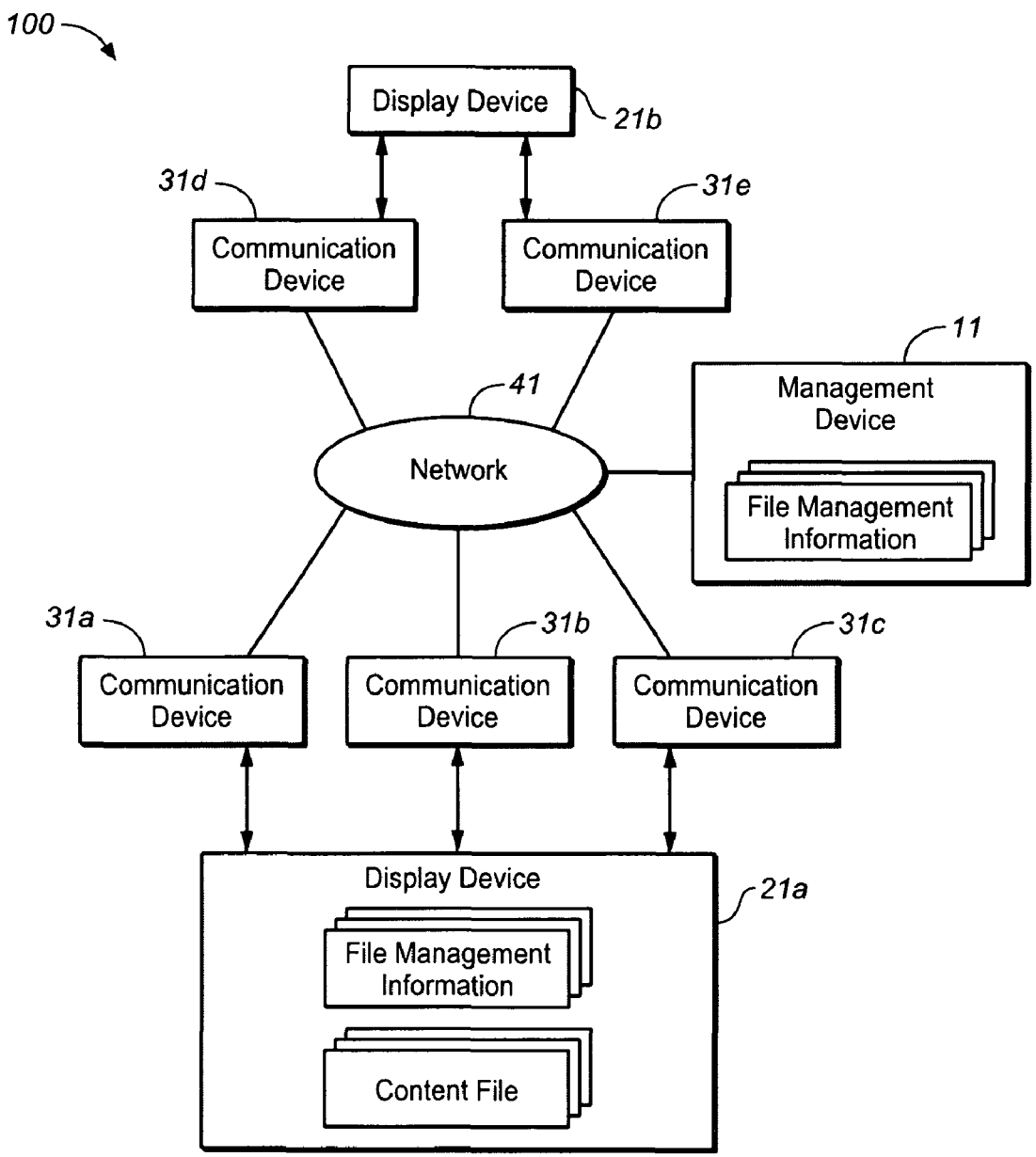
FIG. 1 is a block diagram showing the arrangement of an information management system according to a first embodiment of the invention.

FIG. 1 is a block diagram showing the general arrangement of an information management system 100 according to a first embodiment of the invention. As shown in FIG. 1 the information management system 100 has a management device 11, a plurality of display devices 21a, 21b, a plurality of communication devices 31a to 31e, and a network 41. The display devices 21a, 21b and the communication devices 31a to 31e are devices that are operated by users. The display systems that are used individually by the users in an organization such as a corporation or a group are rendered by these display devices 21a, 21b and communication devices 31a to 31e. In the example shown in FIG. 1 the display system composed of the display device 21a and the communication devices 31a to 31c is used by one single user, and the display system composed of the display device 21b and the communication devices 31d and 31e is used by another single user.

Because plural employees often work together to perform a job in an organization, each display system may also be shared by a number of users instead of being used by only a single user. If this information management system 100 is deployed in a law office, for example, a lawyer may use display device 21a and communication device 31a, the lawyer's secretary may use communication device 31b, and a paralegal that assists the lawyer may use communication device 31c. Note that there may actually be many more display devices 21a, 21b and communication devices 31a to 31e than shown in the figure. The users can use the display devices 21a, 21b and communication devices 31a to 31e by entering an individually assigned user ID and password to log in to the display devices 21a, 21b and communication devices 31a to 31e.

The display devices 21a, 21b are devices that display information, and are small and lightweight so that they can be carried around by the user. These display devices 21a, 21b store "information" that is related to specific "management information" that manages the "information." This "information" is referred to below as "content," and data in a file format for presenting the content is called a "content file." In addition, the "management information" that manages the content is called "file management information." The content files are data files that are converted to a data format compatible with the display devices 21a, 21b from, for example, data files that are created by software programs such as the word processing program Word (R), the spreadsheet program Excel (R), and the presentation program PowerPoint (R) published by Microsoft Corporation, or data files written in such formats as PDF (Portable Document Format), HTML (HyperText Markup Language), or TIFF (Tagged Image File Format). A data format compatible with the display device 21 is any data format that can be interpreted and displayed by the display devices 21a, 21b, such as PDF or a subset of PDF.

The file management information includes metadata and file hierarchy information. The metadata is information relating to the actual data in the content file, and includes such content file attributes as the file name of the content file, the data type, data size, creation date, author, and document title. The metadata also includes information added to the content file, such as messages and annotations such as IMPORTANT, URGENT, PRIVATE (for personal use), and PUBLIC (shared), different types of flags, and digital tags added by the user to part of the content of the content file. The file hierarchy information is information describing the hierarchical relationship between content files and is equivalent to a "directory" in UNIX (R) and MS-DOS and a "folder" in Windows (R) and MacOS (R), and in this embodiment of the invention is referred to as a "directory." In most cases the size of this file management information is smaller than the content file itself. The display devices 21a, 21b manage the individual content files based on this file management information. "Manage" as used herein refers to finding or extracting a content file corresponding to specific file management information from among a group of plural content files, and displaying, editing, or otherwise desirably processing the found or extracted content file.

The communication devices 31a to 31e are computer devices such as a personal computer or a cell phone, and function as the communication unit of the display device 21a, 21b that is connected to the communication device. Each communication device 31a to 31e has a first communication function for data communication with the management device 11 over the network 41, and a second communication function for data communication with the display device 21a, 21b. In FIG. 1 the communication device 31a is a cell phone that is carried by the user, the communication device 31b is a personal computer that is in the home of the user, and the communication device 31c is a personal computer that is in the office of the user. In addition, the communication device 31d is a cell phone that is carried by the user, and the communication device 31e is a personal computer that is in the office of the user. The user of the display device 21a can thus communicate with the display device 21a by connecting to the user's display device 21a using any of the communication devices 31a to 31c.

Communication devices 31a and 31d have a wireless communication circuit that conforms to the 3G-324M standard of the 3GPP (3rd Generation Partnership Project) as a unit of achieving the first communication function, and communication devices 31b, 31c, and 31e have a modem, for example, as a unit of achieving the first communication function. In addition, communication devices 31a and 31d have a wireless interface conforming to a wireless communication standard such as IrDA (Infrared Data Association) or Bluetooth (R) as a unit of achieving the second communication function, and communication devices 31b, 31c, and 31e have a serial interface conforming to a wired communication standard such as USB (Universal Serial Bus), or a wireless interface conforming to a wireless communication standard such as IrDA or Bluetooth (R) as a unit of achieving the second communication function.

The display devices 21a, 21b are arranged and operate in the same way, and are therefore referred to herein as display device 21 unless it is necessary to identify a particular display device. In addition, the communication devices 31a to 31e are the same in that they all function as the communication unit of the display devices 21a, 21b, and are therefore referred to herein as communication device 31 unless it is particularly necessary to identify a specific one.

The network 41 consists of one or a plurality of networks such as the Internet, a LAN (local area network), ISDN (Integrated Services Digital Network), a cell phone network, and a wireless LAN, and connects the management device 11 and the communication device 31a to 31e so that they can communicate. The management device 11 is a computer device connected to the network 41, and provides an information management service to a display system including a communication device 31 and a display device 21. The location where the management device 11 is installed can be inside or outside of the organization.

In the information management system 100 shown in FIG. 1 the display device 21 in each display system stores content files that can be viewed by the display system user and the file management information for each of the content files. The management device 11 that connects to the display system over the network 41 stores for each display device 21 only the file management information for the content files stored in each display device 21, and does not store the actual content files. By using this arrangement the users and the system administrator of the organization to which the user belongs can view the file management information by operating the communication device 31 to access the management device 11 and can generally determine what content files are in the organization without using a display device 21.

The user or system administrator can also change, edit, add, or delete (referred to as "update" below) the content of the metadata and file hierarchy information that is contained in the file management information by operating the communication device 31. The content of the file management information that is updated by the management device 11 is reported to the display device 21 over the network 41, and the file management information in the display device 21 is updated according to the reported content. As a result, the file management information stored by the management device 11 and the content of the file management information stored by the display device 21 can be synchronized.

The display device 21, the communication device 31, and the management device 11 of this information management system 100 are described in detail below.

Figure 2:
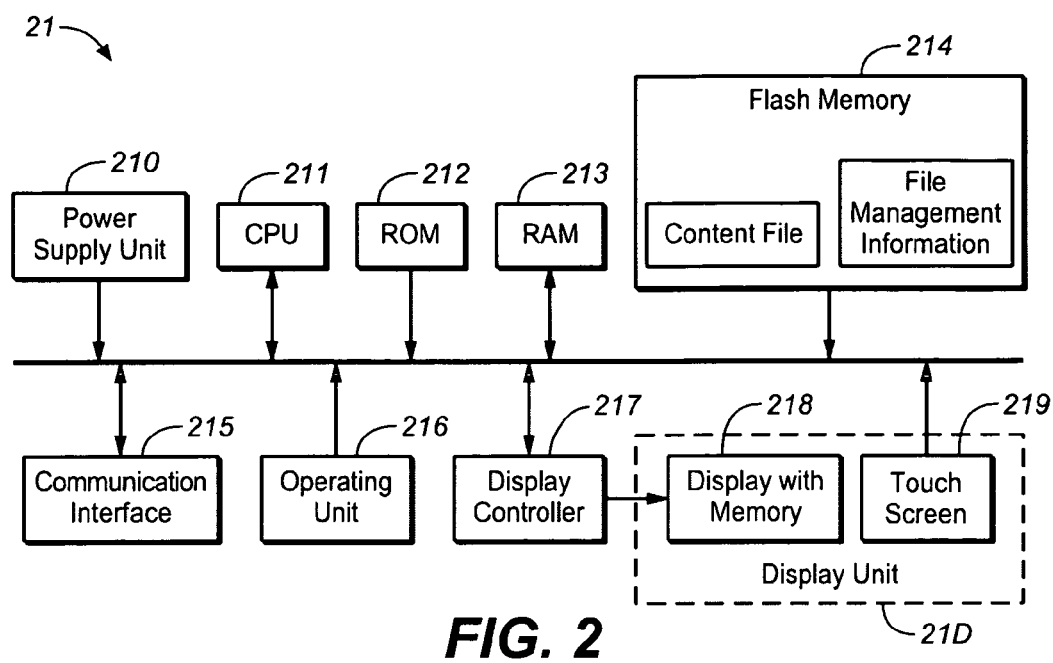
FIG. 2 is a block diagram showing the arrangement of a display device according to the same embodiment.

First, FIG. 2 is a block diagram showing the arrangement of the display device 21.

As shown in FIG. 2 the display device 21 has a power supply unit 210, a CPU 211, ROM 212, RAM 213, flash memory 214, a communication interface 215, an operating unit 216, a display controller 217, a display with memory 218, and a touch screen 219. The power supply unit 210 has a battery and a power control circuit, and supplies the power required for the display device 21 to operate. The battery of the power supply unit 210 is a rechargeable secondary battery such as a Ni—Cd battery or a lithium ion battery.

The CPU 211 executes a program stored in ROM 212 or the flash memory 214 to control the display controller 217 and execute processes such as displaying content and various interactive windows on the display with memory 218. The RAM 213 functions as working area for the CPU 211 when the CPU 211 runs a program. A device ID assigned to the display device 21 is stored in the ROM 212, and this device ID enables uniquely identifying each display device 21. The flash memory 214 is a rewritable storage medium, and stores a program that is run by the CPU 211 as well as the above-described content files and file management information. The flash memory 214 may be configured so that it can be freely installed to and removed from the display device 21. The communication interface 215 communicates data with the communication device 31 according to a wired communication standard or wireless communication standard as described above. The operating unit 216 has a plurality of keys and outputs operating signals corresponding to the operated keys to the CPU 211.

The display controller 217 has a drive circuit for controlling operation of the display with memory 218, supplies drive signals according to the image to be displayed to the display with memory 218 and controls turning the power supplied to the display with memory 218 on and off. The display with memory 218 is a display device having numerous pixels in which liquid crystals with memory are sealed. Liquid crystals with memory are liquid crystals that can retain the display state (that is, gradation) even when voltage is not applied, such as cholesteric liquid crystals. The touch screen 219 is a transparent screen disposed in front of the display with memory 218a seen from the user, and senses contact by an object in each prescribed small area. The touch screen 219 outputs a sense signal denoting contact by an object for each of the small areas, and supplies the signals to the CPU 211. The CPU 211 executes a process determined by the sense signal. The display with memory 218 and the touch screen 219 together render a display unit 21D.

Figure 3:
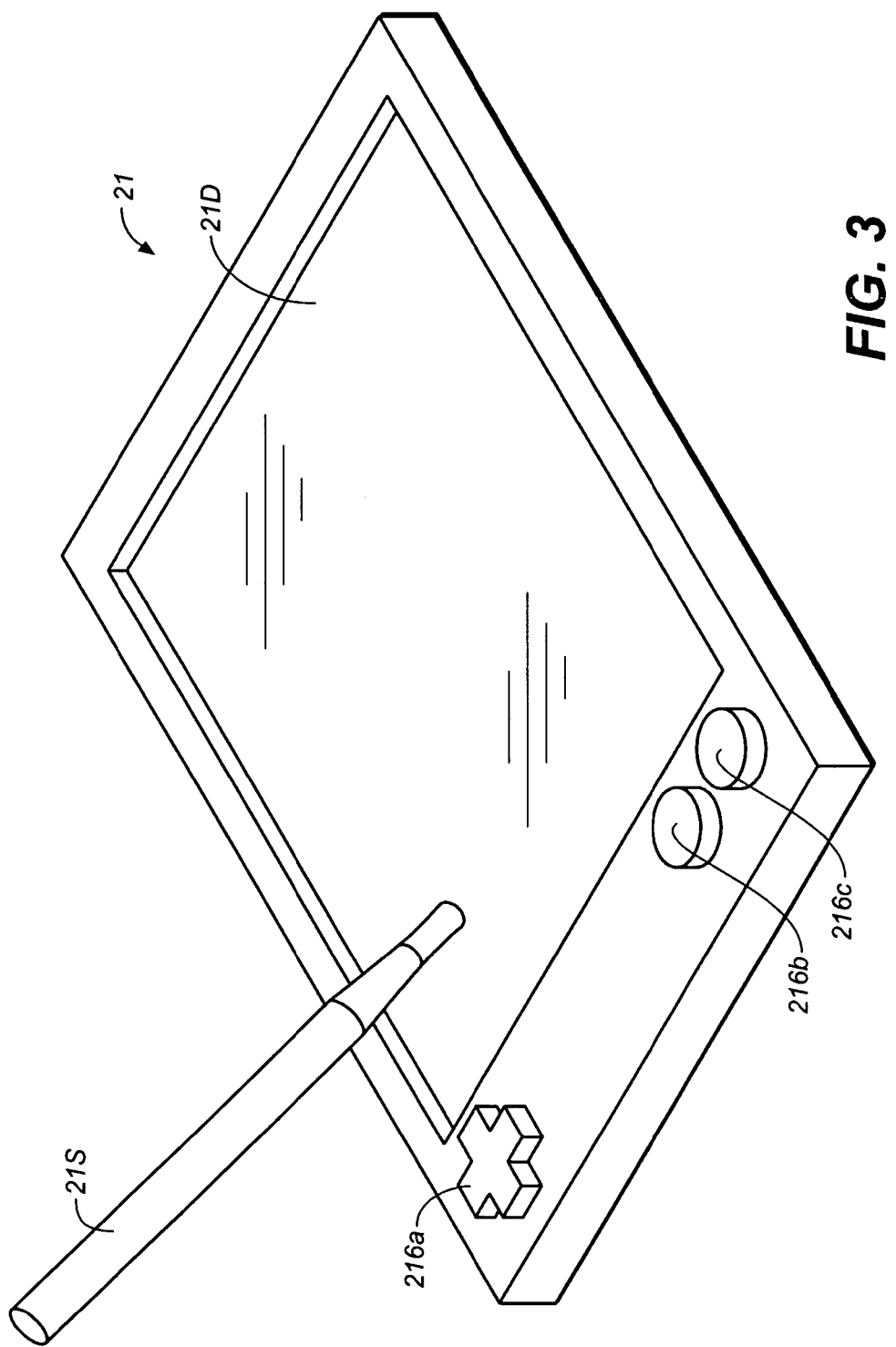
FIG. 3 is an oblique view showing the appearance of a display device according to the same embodiment.

FIG. 3 is an oblique external view of the display device 21.

As shown in FIG. 3 the display unit 21D and a plurality of operating keys 216a to 216c are disposed on the front of the display device 21. A stylus 21S is also used with the display device 21. The stylus 21S is a pen-like instrument for selecting operations from an interactive screen displayed on the display unit 21D. The touch screen 219 is disposed on the surface of the display unit 21D. The operating keys 216a to 216c are operators for accepting user operations, and generate specific corresponding operating signals. The navigation key 216a is a cross-shaped key for changing the document page that is displayed on the display unit 21D, and outputs operating signals that displays the page before or after the currently displayed page or going to different content when it is tilted up or down (or left or right) by the user. As shown in the figure, the display device 21 only has relatively simply operating unit, and does not have an operating unit such as a full keyboard with advanced functionality. An operating unit 315 disposed to the communication device 31 is used when advanced operations such as entering text are needed.

The content of the file management information is described next.

The file management information is written in XML (Extensible Markup Language). FIG. 4 shows an example of this file management information. Text contained between the "<" and ">" symbols in FIG. 4 is called a "tag." Text strings defining the elements contained in the file management information are embedded by these tags in the file management information. For example, "392" on line 2 in FIG. 4 is the file ID (DOCID) assigned to the content file. "Response: Motion to Suppress Evidence" on line 3 is the title of the content. "Michael Claypool" on line 4 is the name of the author of the content file. "11/01/2006" on line 7 is the creation date of the content file. "11/20/2006" on line 8 is the update date of the content file. "Response_To_Motion_v3.0" on line 10 is the file name of the content file.

In line 14 "1;2" identify the flags assigned to the content file. The flag values have uniquely assigned meaning such as IMPORTANT, URGENT, MEMO, PROJECT a, or PROJECT b, and the flag values and their meanings are preset and stored in the display device 21 and the communication device 31. As a result, if, for example, the user uses the operating unit of the communication device 31 to start a search for all content files flagged as URGENT, the control unit 311 of the communication device 31 can search the file management information for the content files stored in the display device 21 to find the file management information containing the flag meaning URGENT, and display the file names contained in the file management information returned by the search as the search result. Such searches are not limited to searching based on these flag values, and searches can be based on any of the tags contained in the file management information.

"Private" in line 18 in FIG. 4 unit that the content file can only be viewed by authorized users. Although not shown in the figure, if this tag is set to "public" in the file management information, the content file can be viewed by all users. In line 19 the message "This is our response to the motion filed on 11.21.06" is a comment appended by the user to the above-noted flag.

The content between the <collection> tag in line 27 and the </collection> tag in line 48 contains the file IDs for the content files in the same directory. In this example the directory identified by directory ID "1000" and the directory name "Litigation" contains the content files with file IDs 392, 400, 389, 393, and 395. The OS (operating system) of the communication device 31 or other computing device generally creates a directory every day a data file is created, and stores the data files in the directory. The method of managing content files based on the content written between the <collection> and </collection> tags in the file management information shown in FIG. 4 is a method of virtually storing content files in a desirable directory specified by the user. This storage method is a so-called nested structure (nesting structure). This aspect of the invention can thus achieve a virtual storage format that differs from the actual storage format of the content files by using file management information.

The arrangement of the communication device 31 is described next.

Figure 5:
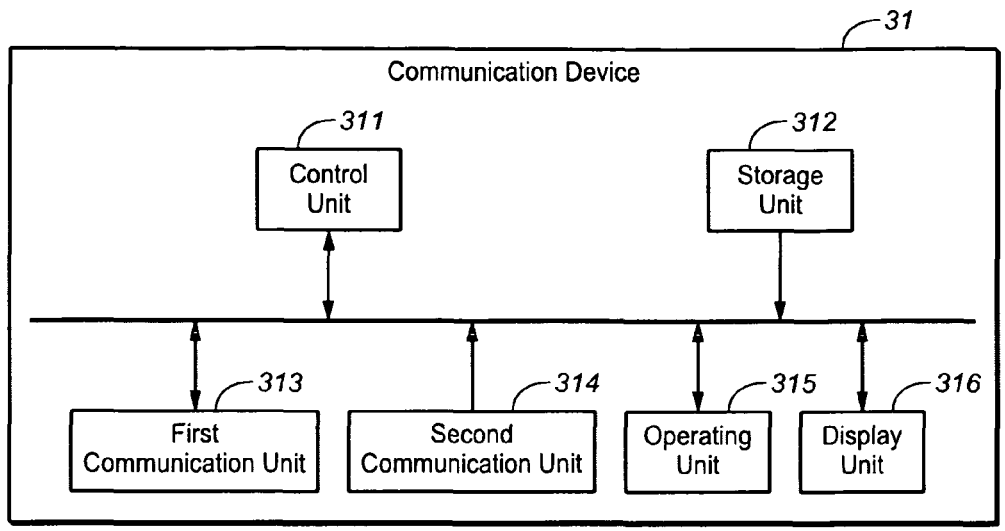
FIG. 5 is a block diagram showing the arrangement of a display device according to the same embodiment.

FIG. 5 is a block diagram showing the arrangement of the communication device 31. As shown in FIG. 5 the communication device 31 has a control unit 311, a storage unit 312, a first communication unit 313, a second communication unit 314, an operating unit 315, and a display unit 316. The storage unit 312 is, for example, a hard disk, flash memory, or EEPROM (Electronically Erasable and Programmable Read Only Memory), stores a program that is run by the control unit 311, and has a storage area for temporarily storing content files. This storage area is referred to below as "cache area." The control unit 311 includes a CPU and memory, for example, and controls the other parts of the communication device 31 by running a program stored in the storage unit 312. The first communication unit 313 is an interface for data communication with the management device 11 over the network 41. The second communication unit 314 is a communication interface for data communication with the display device 21 using a wired communication standard or wireless communication standard as described above.

The arrangement of the management device 11 is described next.

Figure 6:
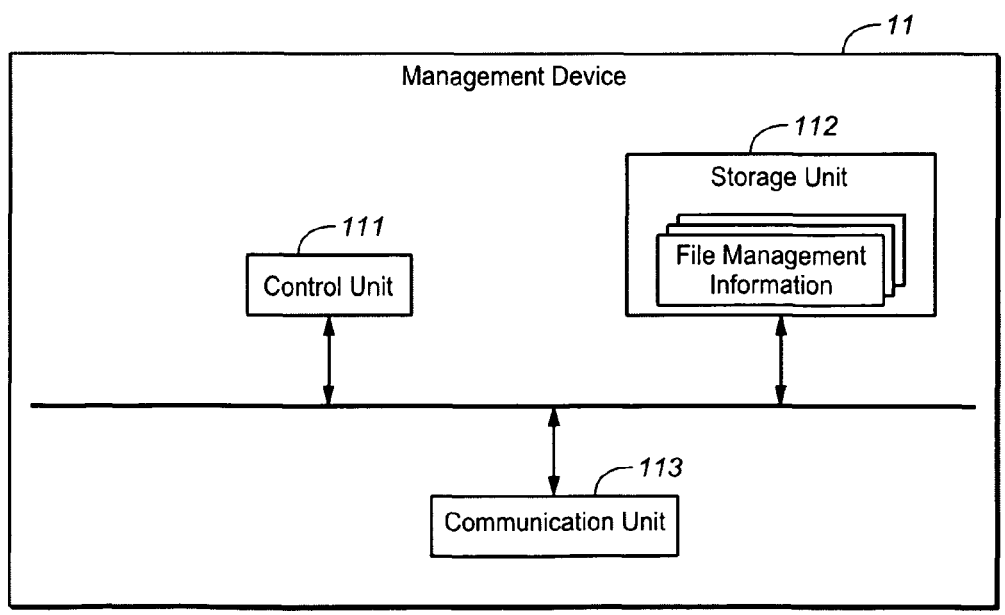
FIG. 6 is a block diagram showing the arrangement of a management device according to the same embodiment.

FIG. 6 is a block diagram showing the arrangement of the management device 11. As shown in FIG. 6 the management device 11 has a control unit 111, a storage unit 112, and a communication unit 113. The storage unit 112 is a hard disk, for example, and stores the file management information and programs executed by the control unit 111. The storage unit 112 stores the file management information for the content files stored in each display device 21 linked to the device ID assigned to the respective display device 21. The control unit 111 includes a CPU and memory, for example, and controls the other parts of the management device 11 by running a program stored in the storage unit 112. The communication unit 113 is a communication interface for data communication with the communication device 31 over the network 41.

The first embodiment of the invention is arranged as described above.

The operation of the first embodiment of the invention is described next.

Figure 7:
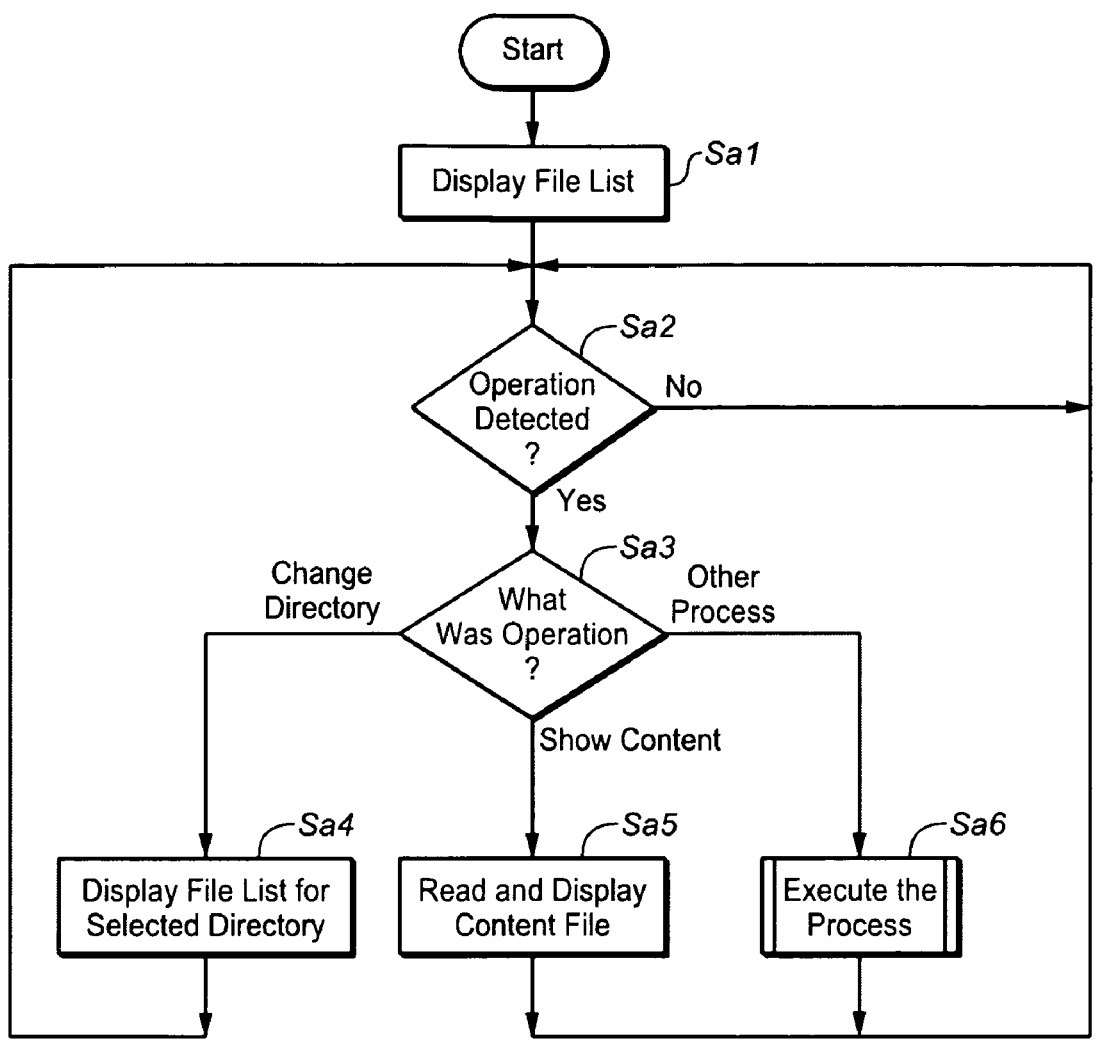
FIG. 7 is a flow chart showing the process of the display device according to the same embodiment.

Operation when the display device 21 is used as a standalone display device not connected to the communication device 31 is described first. When the user turns the display device 21 power on and logs in to the display device 21 by entering the user ID and password, for example, the process shown in the flow chart in FIG. 7 starts. Referring to FIG. 7, the CPU 211 displays a file list on the display with memory 218 based on the file management information stored in the flash memory 214 (step Sa1).

Figure 8A:
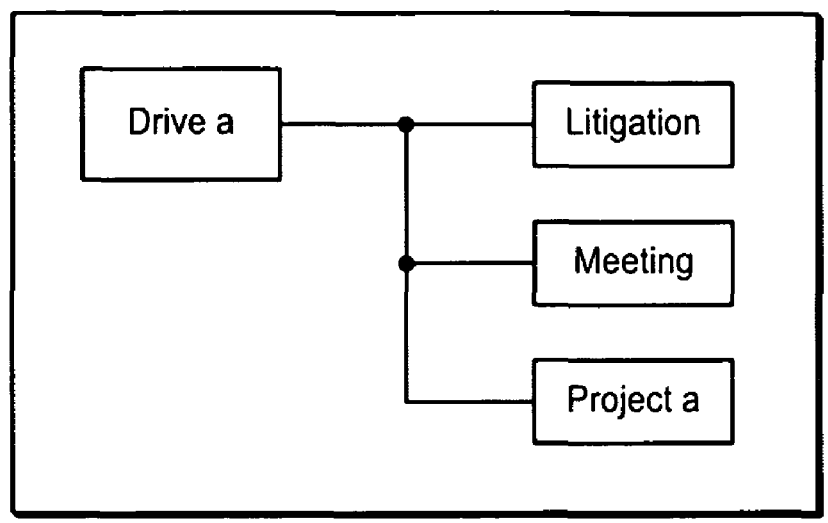
FIG. 8A shows an example of a file list displayed by the display device according to the same embodiment, and 8B shows an example of a file list displayed by the display device according to the same embodiment.

FIG. 8(A) shows an example of the file list displayed on the display with memory 218 at this time. This file list is generated for each directory level, and FIG. 8(A) shows a list of the directories at the top level. "Drive a" in the figure denotes the flash memory drive, and "Litigation," "Meeting," and "Project a" are the directory names for the top level directories stored in the flash memory.

Figure 8B:
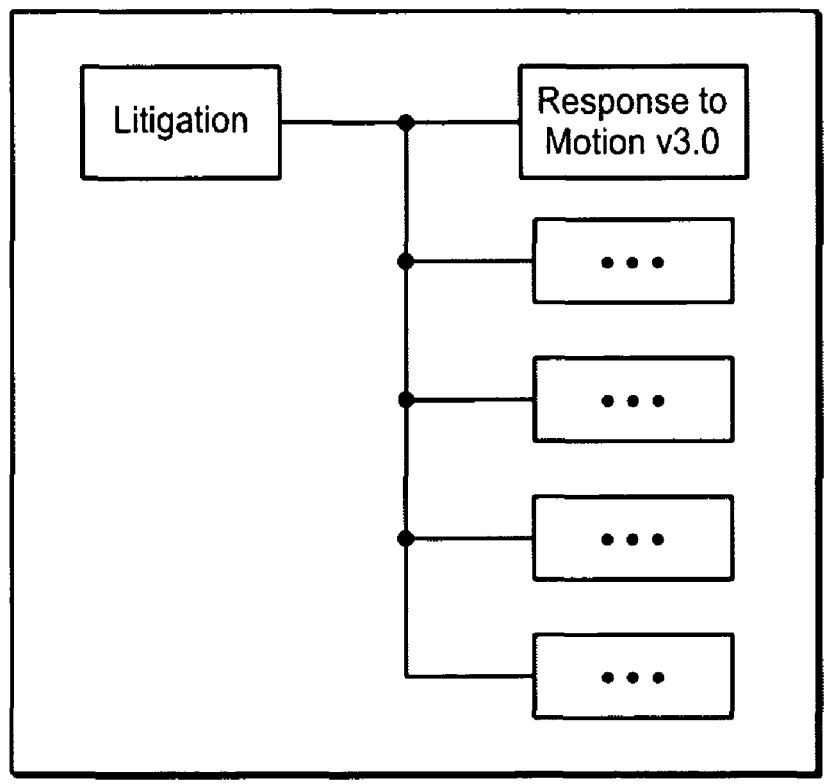

When the user then operates the operating unit 216 and the CPU 211 detects the operation (step Sa2 returns Yes), the CPU 211 evaluates the content of the operation (step Sa3). If the operation is a command to go from the currently displayed file list to a file list at a different directory level (step Sa3: Change Directory), the CPU 211 generates and displays on the display with memory 218 a file list for the selected level based on the file management information stored in the flash memory 214 (step Sa4). For example, if the user selects the directory labeled "Litigation" in FIG. 8(A), the CPU 211 displays a file list listing the file names for the content files in the directory of the directory name Litigation based on the file management information stored in the flash memory 214 on the display with memory 218 as shown in FIG. 8(B).

If the operation detected in step Sa3 is a command to select a content file from the displayed file list and display the content file (step Sa3: Show Content), the CPU 211 reads the selected content file from flash memory 214 and displays the content file on the display with memory 218 (step Sa5). For example, if the user uses the operating unit 216 to select the file labeled "Response To Motion v3.0.doc" in FIG. 8(B), the CPU 211 reads the content file with file name "Response To Motion v3.0.doc" from the flash memory 214 and displays the file on the display with memory 218. As a result, the user can view the content of the desired content file.

If the operation detected in step Sa3 is a command to execute another process (step Sa3: Other Process), the CPU 211 executes the specified process (step Sa6). Examples of such other processes include turning the page and configuring the display device 21. After completing the operation in step Sa4, Sa5, or Sa6, the CPU 211 returns to step Sa2 and waits for user input.

Operation when the display device 21 and communication device 31 are connected is described next.

Figure 9:
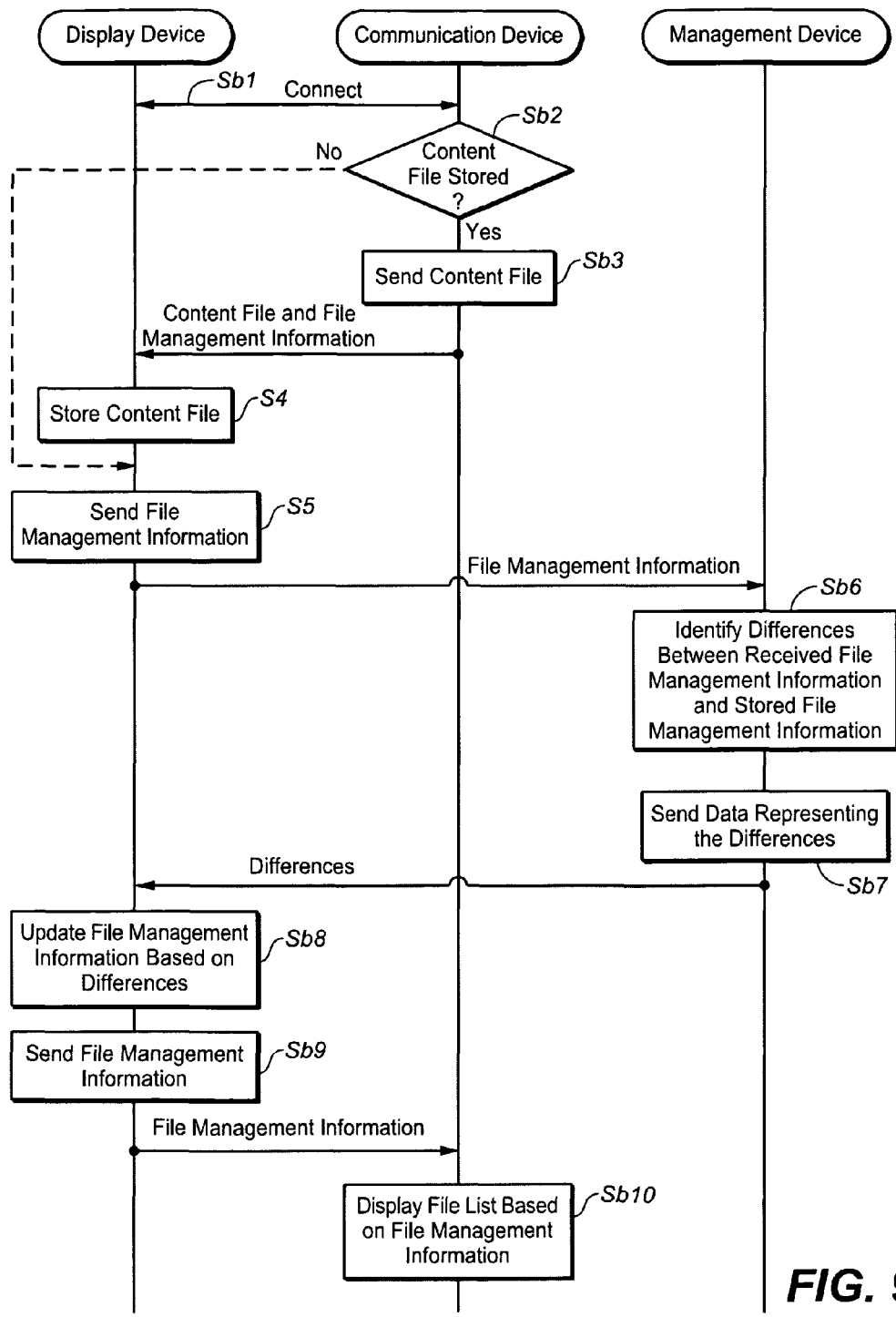
FIG. 9 is a sequence chart showing an example of the operation of an information management system according to the same embodiment.

Referring to the sequence chart shown in FIG. 9, when the user performs a specific task or operation and connects the communication interface 215 of the display device 21 and the second communication unit 314 of the communication device 31 (step Sb1), the CPU 211 of the display device 21 sends the device ID to the communication device 31. The control unit 311 of the communication device 31 then determines if there are any content files linked to the device ID in the cache area of the storage unit 312 (step Sb2). If a content file is in the cache area (step Sb2 returns Yes), the control unit 311 reads the content file from the cache area and sends the content file from the second communication unit 314 to the display device 21 (step Sb3).

If a content file is not found in the cache area (step Sb2 returns No), the control unit 311 reports this to the display device 21, and the CPU 211 of the display device 21 goes to step Sb5 described below as indicated by the dotted line in the figure.

When the display device 21 and the communication device 31 are not connected, content files stored in the cache area are content files that are newly added on the communication device 31. The CPU 211 of the display device 21 stores the content file received by the communication interface 215 to the flash memory 214 (step Sb4). When the control unit 311 confirms that the content file was sent to the display device 21 in step Sb3, it deletes the content file from the cache area.

The CPU 211 of the display device 21 then reads all file management information stored in the flash memory 214, and sends the file management information with the device ID of the display device 21 from the communication interface 215 to the communication device 31 (step Sb5). The control unit 311 of the communication device 31 passes the device ID and file management information received by the second communication unit 314 to the management device 11 from the first communication unit 313. The control unit 111 of the management device 11 temporarily stores the device ID and file management information received by the communication unit 113 to the storage unit 112. The management device 11 then compares file management information that was stored linked to the device ID before the device ID and file management information were received with the received file management information to identify any differences in the information (step Sb6).

The control unit 111 then sends data describing the identified differences together with the device ID contained in the differing file management information from the communication unit 113 to the communication device 31 (step Sb7). The control unit 311 of the communication device 31 receives this through the first communication unit 313, and passes it from the second communication unit 314 to the display device 21. The CPU 211 of the display device 21 then updates the file management information stored in the flash memory 214 based on the data received by the communication interface 215 (step Sb8). This results in the file management information stored by the management device 11 and the file management information stored by the display device 21 containing the same content, and the file management information is thus synchronized on both devices.

The CPU 211 of the display device 21 then reads all file management information stored in the flash memory 214 and sends the file management information from the communication interface 215 to the communication device 31 (step Sb9). The control unit 311 of the communication device 31 then displays a file list on the display unit 316 based on the file management information received by the second communication unit 314 (step Sb10). The file list displayed at this time is the same as the screen shown in FIG. 8(A).

Figure 10:
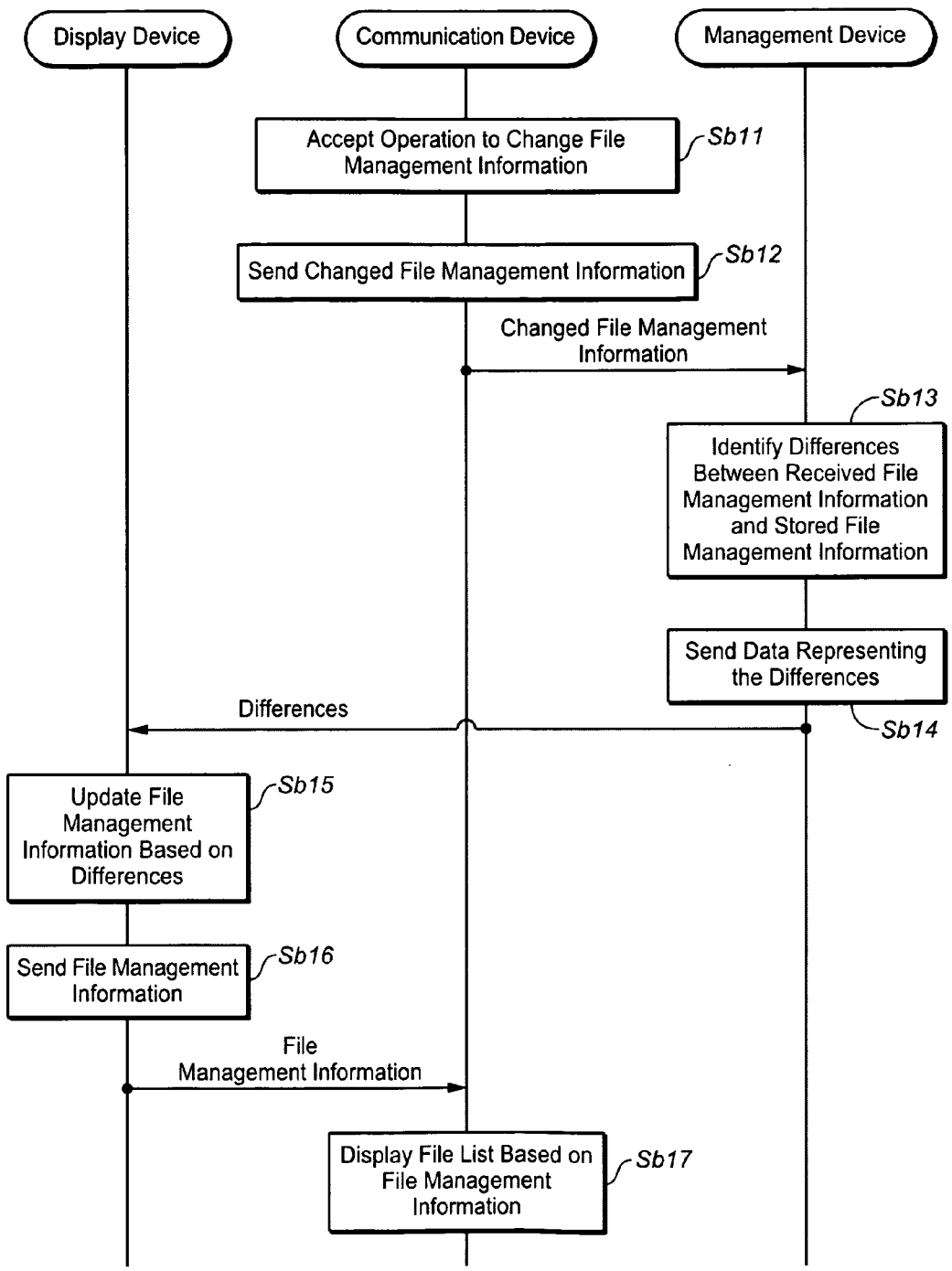
FIG. 10 is a sequence chart showing an example of the operation of an information management system according to the same embodiment.

Continuing from the sequence chart shown in FIG. 10, the user uses the operating unit 315 of the communication device 31 to display a file list as shown in FIG. 8(B), then selects a content file, and issues a command to change the file management information for that content file. This operation is, for example, an operation that changes the content of the metadata contained in the file management information, or an operation that changes the file hierarchy information. When the control unit 311 receives the operation (step Sb11), it changes the content of the file management information according to the content of the command, and sends the updated file management information together with the device ID of the display device 21 from the first communication unit 313 to the management device 11 (step Sb12). As a result, the control unit 311 instructs the management device 11 to update the file management information to the changed content.

The control unit 111 of the management device 11 temporarily stores the device ID and file management information received by the communication unit 113 to the storage unit 112. The control unit 111 then identifies the file management information having the same file ID as the received file management information in the file management information that was already stored linked to that device ID before the device ID and file management information were received, compares the identified file management information with the received file management information, and identifies the differences in the information (step Sb13). The control unit 111 then sends data describing the identified differences together with the device ID from the communication unit 113 to the communication device 31 (step Sb14). The control unit 311 of the communication device 31 then passes this data to the display device 21.

The CPU 211 of the display device 21 then updates the file management information stored in the flash memory 214 based on the data received by the communication interface 215 (step Sb15). This results in the file management information stored by the management device 11 and the file management information stored by the display device 21 containing the same content. The CPU 211 of the display device 21 then reads all file management information stored in the flash memory 214 and sends the file management information from the communication interface 215 to the communication device 31 (step Sb16). The control unit 311 of the communication device 31 then displays a file list on the display unit 316 based on the file management information received by the second communication unit 314 (step Sb17).

The file list displayed at this time is the same as the screen shown in FIG. 8(A). In this example the directory name "Litigation" in the file management information of the content file of file name "Response To Motion v3.0.doc" is rewritten to the directory name of a different directory. In this case if the directory name "Litigation" in FIG. 8(A) is selected and a command is issued to display a file list of that directory, the content file of the file name "Response To Motion v3.0.doc" will not be displayed in the file names of the file list shown in FIG. 8(B). This is because this content file was moved to a different directory as a result of rewriting the file management information. In this way the user can manage the content files without actually accessing the content files by simply using the communication device 31 to access the file management information stored by the management device 11 and change the content of the file management information.

The operation of adding a new content file to the information management system 100 is described next.

Figure 11:
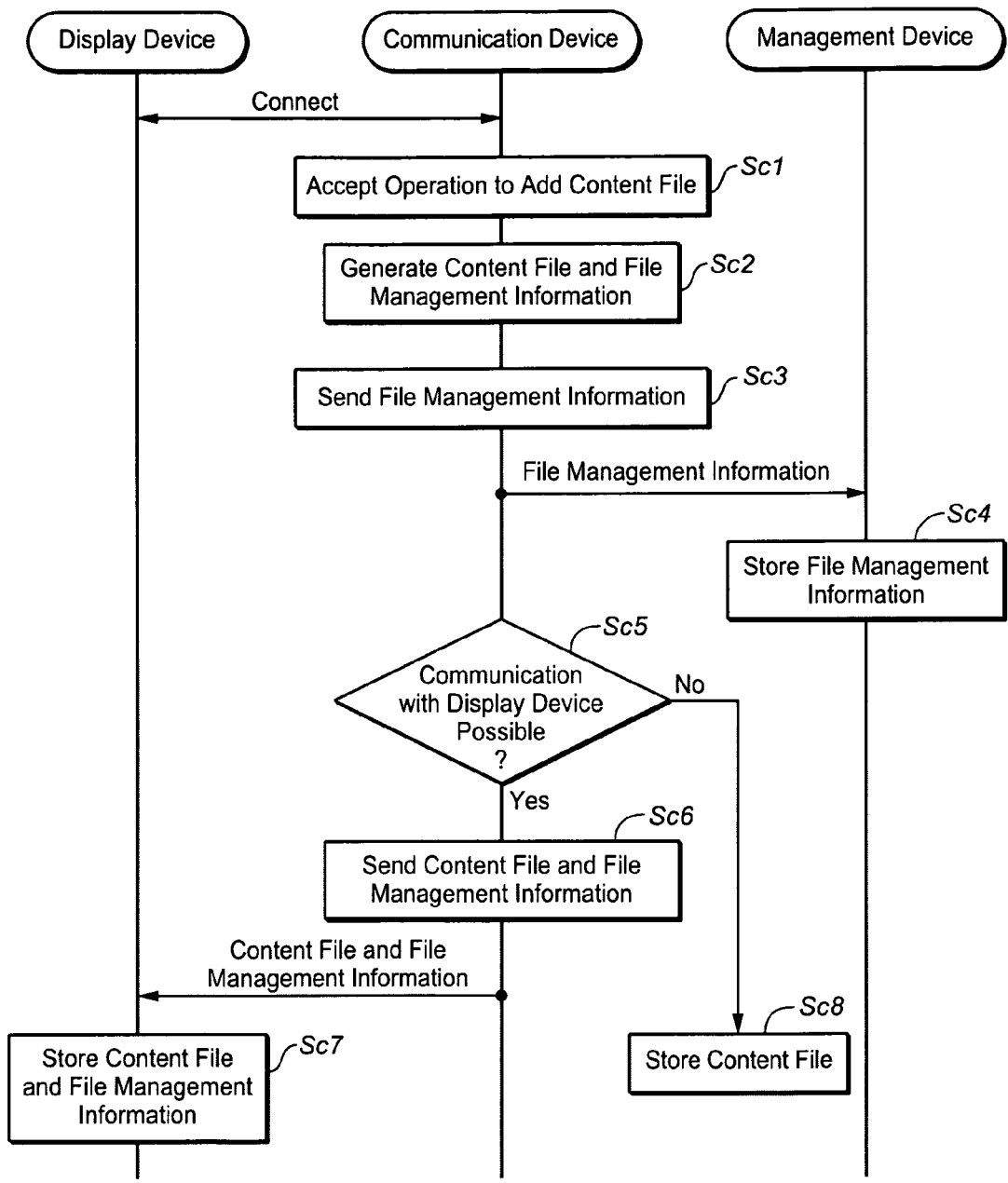
FIG. 11 is a sequence chart showing an example of the operation of an information management system according to the same embodiment.

Referring to the sequence chart shown in FIG. 11, when the communication interface 215 of the display device 21 and the second communication unit 314 of the communication device 31 connect, the control unit 311 of the communication device 31 displays a file list on the display with memory 218 as described in steps Sb1 to step Sb10 in FIG. 9. The user then uses the operating unit 315 of the communication device 31 to select a particular directory from the file list and performs an operation to add a new content file. More specifically, when the user selects a directory and saves a content file, the control unit 311 displays a dialog box for saving the content file on the display unit 316. The user enters the desired file name of the data file in this dialog box and asserts a command to save the file. The data file added as a content file may be a new data file generated based on user input using a word processing program run by the control unit 311 of the communication device 31, or a data file that is read by the control unit 311 from a recording medium connected to the communication device 31, for example.

When the control unit 311 receives this operation (step Sc1), the control unit 311 converts the data to a data format compatible with the display device 21 to generate the content file and generates the file management information (step Sc2). Information contained in the file management information that is preset as metadata of the data file, such as the author and the creation date, can be written directly by the control unit 311 in the file management information. Information that is preset, such as the file ID and flags, can be generated by the control unit 311 according to prescribed algorithms, or generated according to user-defined content. The control unit 311 can generate the file hierarchy information according to user-defined content. The control unit 311 then sends the resulting file management information together with the device ID of the display device 21 from the first communication unit 313 to the management device 11 (step Sc3). The control unit 111 of the management device 11 stores the file management information received by the communication unit 113 linked to the device ID in the storage unit 112 (step Sc4).

The control unit 311 of the communication device 31 then determines if communication with the display device 21 is possible (step Sc5). If communication with the display device 21 is possible, the communication interface 215 of the display device 21 and the second communication unit 314 of the communication device 31 are connected; if communication with the display device 21 is not possible, the communication interface 215 of the display device 21 and the second communication unit 314 of the communication device 31 are not connected. Because the communication device 31 and the display device 21 can communicate in FIG. 11 (step Sc5 returns Yes), the control unit 311 of the communication device 31 sends the content file and the file management information to the display device 21 (step Sc6). The CPU 211 of the display device 21 stores the content file and the file management information received by the communication interface 215 to the flash memory 214 (step Sc7).

If in step Sc5 communication between the communication device 31 and the display device 21 is not possible (step Sc5 returns No), the control unit 311 of the communication device 31 stores the content file linked to the device ID of the display device 21 in the cache area of the storage unit 312 (step Sc8). The next time the communication device 31 and the display device 21 connect the content files stored in this cache area are sent from the communication device 31 to the display device 21 and stored to the flash memory 214 of the display device 21 in steps Sb1 to Sb4 in FIG. 9. When the control unit 311 confirms that the content file was sent to the display device 21, the control unit 311 erases the content file from the cache area.

This enables adding a new content file to the information management system 100.

The operation when editing a content file stored in the display device 21 is described next.

Figure 12:
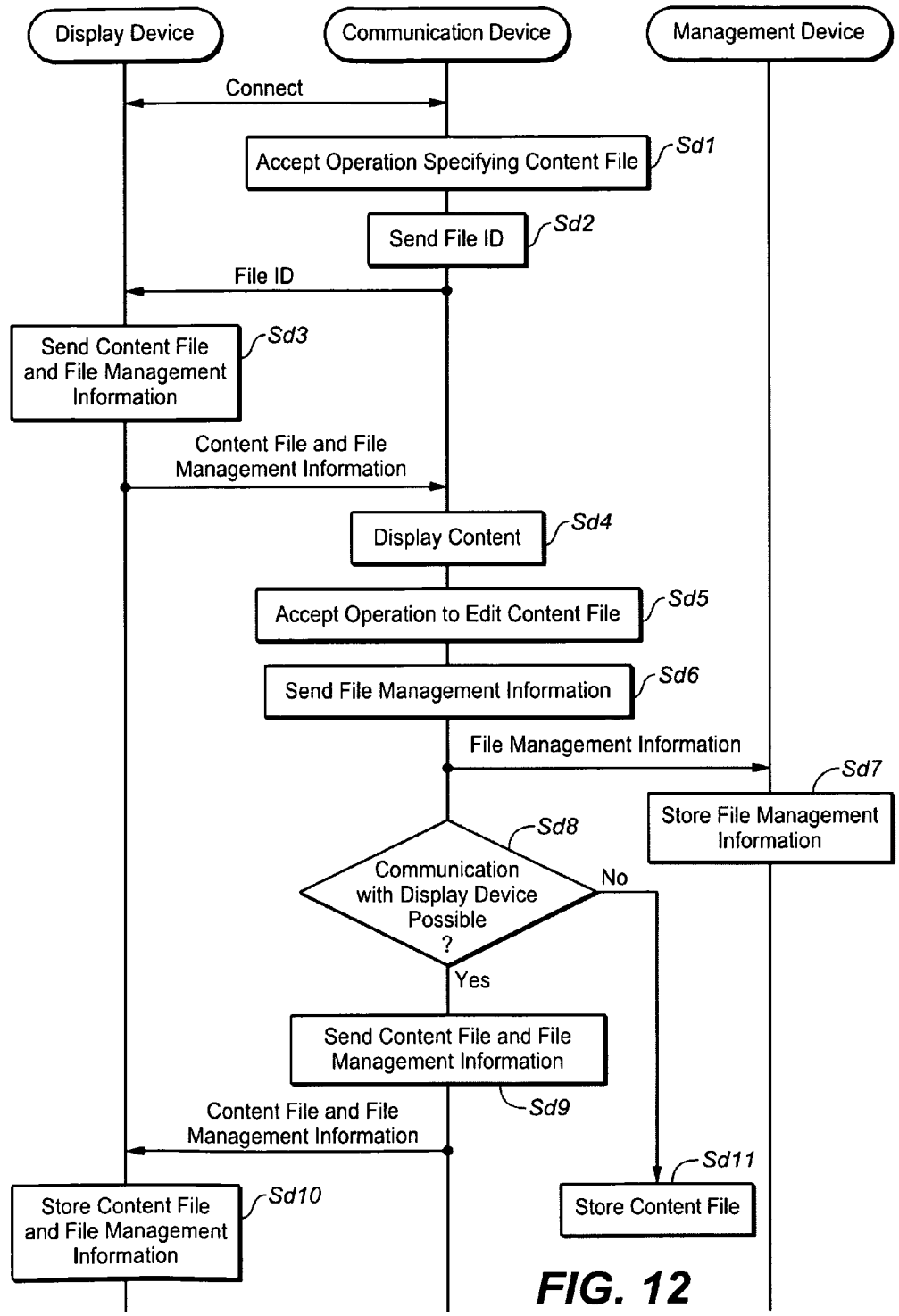
FIG. 12 is a sequence chart showing an example of the operation of an information management system according to the same embodiment.

Referring to the sequence chart shown in FIG. 12, when the communication interface 215 of the display device 21 and the second communication unit 314 of the communication device 31 connect, the control unit 311 of the communication device 31 displays a file list on the display with memory 218 as described in steps Sb1 to step Sb10 in FIG. 9. In this example the user then uses the operating unit 315 of the communication device 31 to select a content file from the file list and performs an operation to display the content file. When the control unit 311 receives this operation (step Sd1), the control unit 311 sends the file ID of the selected content file from the second communication unit 314 to the display device 21 and requests the content file of that ID (step Sd2).

In response to this request the CPU 211 reads and sends the content file and the file management information for the received file ID from the flash memory 214 to the communication device 31 through the communication interface 215 (step Sd3). When the content file and file management information are received by the second communication unit 314, the control unit 311 of the communication device 31 interprets the content file and displays the content on the display unit 316 (step Sd4). The user then uses the operating unit 315 to edit the content while referring to the displayed content. For example, if the user inputs new text to the content, the control unit 311 receives this text input, edits the content of the content file, and displays the entered text on the display unit 316 (step Sd5). The control unit 311 also edits the update date and file management information as may be necessary.

When the user finishes editing the content, the user uses the operating unit 315 to save the content file. In response to this operation the control unit 311 sends it with the device ID of the display device 21 connected to the communication device 31 to the management device 11 (step Sd6). The control unit 111 of the management device 11 stores the file management information received by the communication unit 113 linked to the device ID in the storage unit 112 (step Sd7).

Next, the control unit 311 of the communication device 31 determines if communication with the display device 21 is possible (step Sd8). If communication with the display device 21 is possible (step Sd8 returns Yes), the control unit 311 sends the content file and the file management information to the display device 21 (step Sd9). The CPU 211 of the display device 21 then stores the content file and the file management information received by the communication interface 215 to the flash memory 214 (step Sd10).

If in step Sd8 communication between the communication device 31 and the display device 21 is not possible (step Sd8 returns No), the control unit 311 of the communication device 31 stores the content file in the cache area of the storage unit 312 (step Sd11). When the communication device 31 and the display device 21 connect, the content files stored in this cache area are sent from the communication device 31 to the display device 21 and stored to the flash memory 214 of the display device 21 in steps Sb1 to Sb4 in FIG. 9. When the control unit 311 confirms that the content file was sent to the display device 21, the control unit 311 erases the content file from the cache area.

This enables editing the content of a content file in the information management system 100.

The first embodiment of the invention described above enables managing content files using file management information stored in the management device 11. "Manage" as used herein refers to finding or extracting a content file corresponding to specific file management information from among a group of plural content files, and displaying, editing, or otherwise desirably processing the found or extracted content file.

Because the management device 11 does not store the actual content files, this first embodiment of the invention does not contravene security policies that prohibit sending the content files of an organization to an outside organization even if the management device 11 is located outside the organization. Furthermore, because the display system (display device 21) that is operated by the user stores the content files, this embodiment of the invention satisfies the user desire to keep content files locally. Furthermore, because file management information that contains less data than the content files is sent and received between the display system and the management device 11 in this embodiment of the invention, it is not a great problem if the communication environment of the display system that is operated by the user is not suited to transmitting large amounts of data. Furthermore, because the management device 11 stores file management information that contains less data than the content files, the management device 11 requires less storage capacity than if the management device 11 stored the content files.

Furthermore, content files can be managed according to the file hierarchy desired by the user because the hierarchical relationship of the content files can be determined according to the file hierarchy information contained in the file management information and this file hierarchy information can be changed by the user. In addition, because flags, comments, and other additional information can be freely added by the user to the file management information, this additional information is useful for organizing the content files.

The management device 11 stores the file management information in the first embodiment described above. The second embodiment described below selectively uses a mode in which the management device 11 stores the file management information as in the first embodiment, and a mode in which the communication device 31 stores the file management information instead of the management device 11. More specifically, the function of the management device 11 in the first embodiment is given to the communication device 31, and there are situations in which the user may prefer this arrangement. That is, the communication device 31 in this embodiment has both the function of the communication device 31 in the first embodiment and the function of the management device 11 in the first embodiment. The former "mode in which the management device 11 stores the file management information" is called the "management-device-related mode," and the latter "mode in which the communication device 31 stores the file management information" is called the "communication-device-related mode."

In this second embodiment of the invention the file management information that is transferred between the display device 21 and the management device 11 is encrypted in the management-device-related mode, and the content files and file management information that are transferred between the display device 21 and the communication device 31 are encrypted in the communication-device-related mode.

The display device 21 and the management device 11 each store a key (first key) for encrypting and decrypting content files and file management information in the management-device-related mode. When transferring file management information between the display device 21 and the management device 11 in this management-device-related mode the file management information is encrypted and the encrypted file management information is decrypted using the first key stored by the display device 21 and the management device 11.

The display device 21 also stores a key (second key) that is used for encrypting and decrypting content files and file management information in the communication-device-related mode. Before file management information is transferred between the display device 21 and the communication device 31 in the communication-device-related mode, the second key stored by the display device 21 is sent to the communication device 31 so that the display device 21 and the communication device 31 each store the second key. When transferring content files and file management information between the display device 21 and the communication device 31 in this mode, the content files and file management information are encrypted and the encrypted content files and file management information are decrypted using the second key stored by the display device 21 and the communication device 31. When this transfer ends the second key stored by the communication device 31 is deleted.

This second embodiment of the invention also allows for a plurality of users to share a single display device 21. One of the plural users is the "host user," and other users are "guest users." The first user to use the display device 21 is the host user, for example, and the host user has the authority to operate the display device 21 to register, add, and delete the plural guest users on the information management system 100. The host user also has the authority to access all content files stored on the display device 21 and the authority to initialize the display device 21.

The arrangement of this second embodiment is described next focusing on the differences from the first embodiment.

Figure 13:
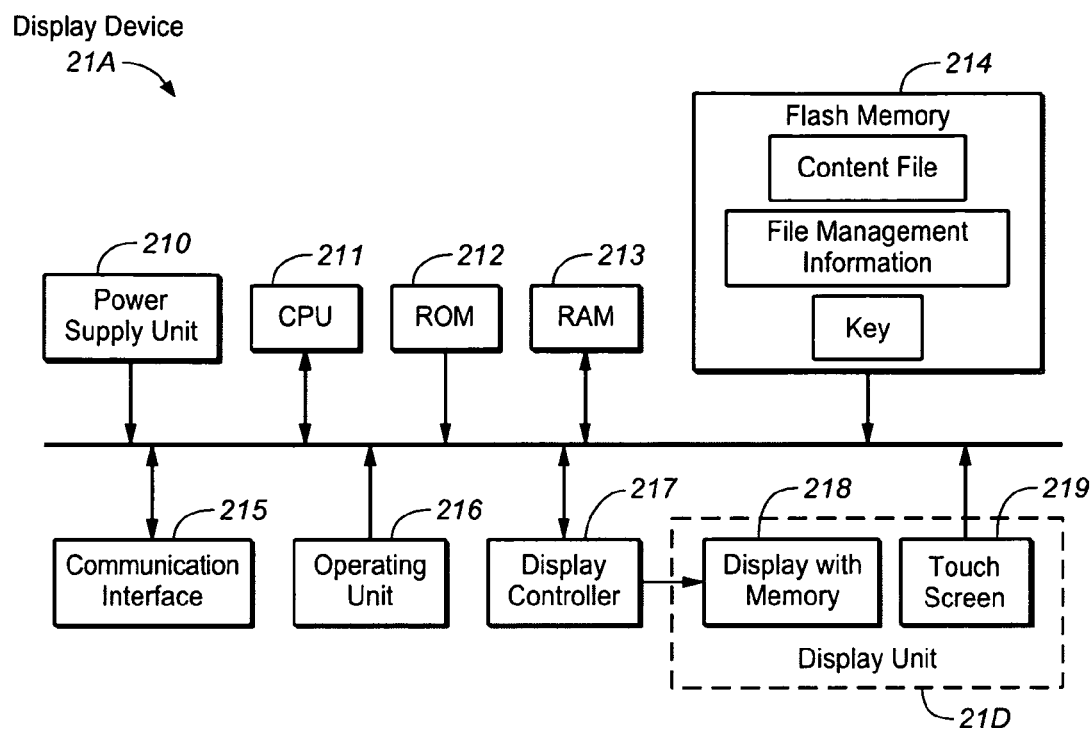
FIG. 13 is a block diagram showing the arrangement of a display device according to a second embodiment of the invention.

FIG. 13 shows the arrangement of a display device 21A according to this second embodiment of the invention. Like elements are identified by the same reference numerals in FIG. 13 and FIG. 2. As shown in FIG. 13 the flash memory 214 stores, in addition to the content files and file management information, the foregoing first key and second key, a key management table that manages the keys, and fingerprint data for each user. The first key and the second key can be generated by a prescribed key generation algorithm, and keys that are generated by the communication device 31 can be distributed to the display device 21A and the management device 11 and stored in the display device 21A and the management device 11. In this case the communication device 31 deletes the stored generated first key and second key after distribution of the first key and the second key is completed.

The basic part of the operation of the second embodiment is the same as the first embodiment, and what differs is that there are the above-noted management-device-related mode and communication-device-related mode, and that the file management information transferred between the display device 21A and the management device 11 is encrypted and decrypted using the first key in the management-device-related mode, and the content files and file management information transferred between the display device 21A and the communication device 31 are encrypted and decrypted using the second key in the communication-device-related mode.

By encrypting the content files and file management information using the first key or second key, this second embodiment of the invention can prevent unauthorized third parties from accessing the content. In addition, the display device 21A can be shared by a plurality of users based on their assigned access rights. Furthermore, because the second key used by the communication device 31 is deleted after being used, a higher level of security can be assured. Yet further, because the display device 21A and the management device 11 can know if the user is the host user or a guest user, user management appropriate to the host user or guest user is possible even if the display device 21A and the management device 11 are not connected.

A third embodiment of the invention is described next.

This third embodiment has a content server in which many content data files are stored, and the user can find content data meeting search criteria specified by the user using the communication device 31 in the content data stored by the content server, and can handle the search results as content files.

Figure 14:
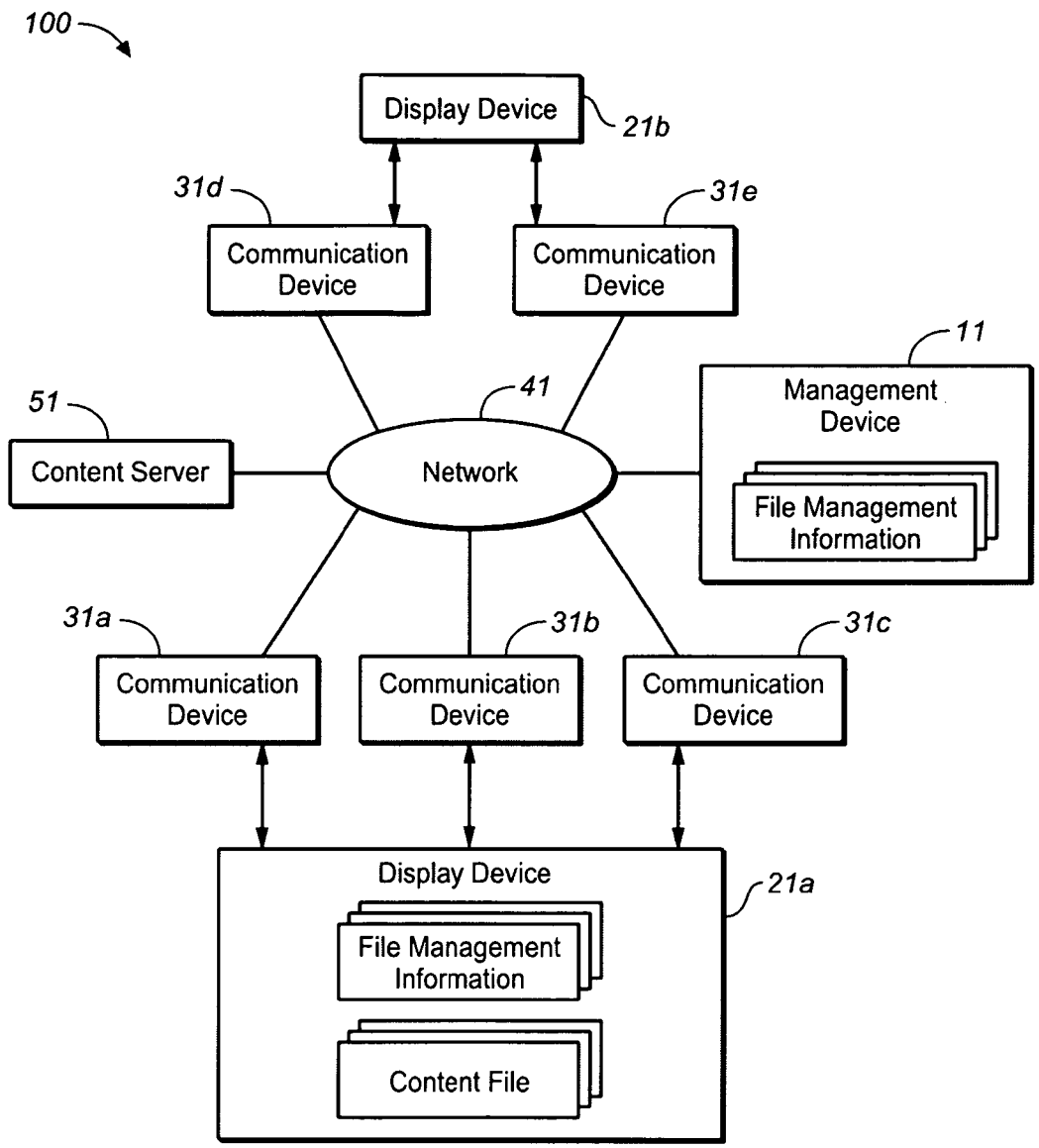
FIG. 14 is a block diagram showing the arrangement of an information management system according to a third embodiment of the invention.

FIG. 14 is a block diagram showing the arrangement of a system according to this third embodiment of the invention.

As shown in FIG. 14 a content server 51 is connected to the network 41. This content server 51 is a computer device such as a WWW (World Wide Web) server, and has a function for storing a plurality of content data files, and a function for searching this content data and outputting content data that matches specified search criteria (such as keywords).

Figure 15:
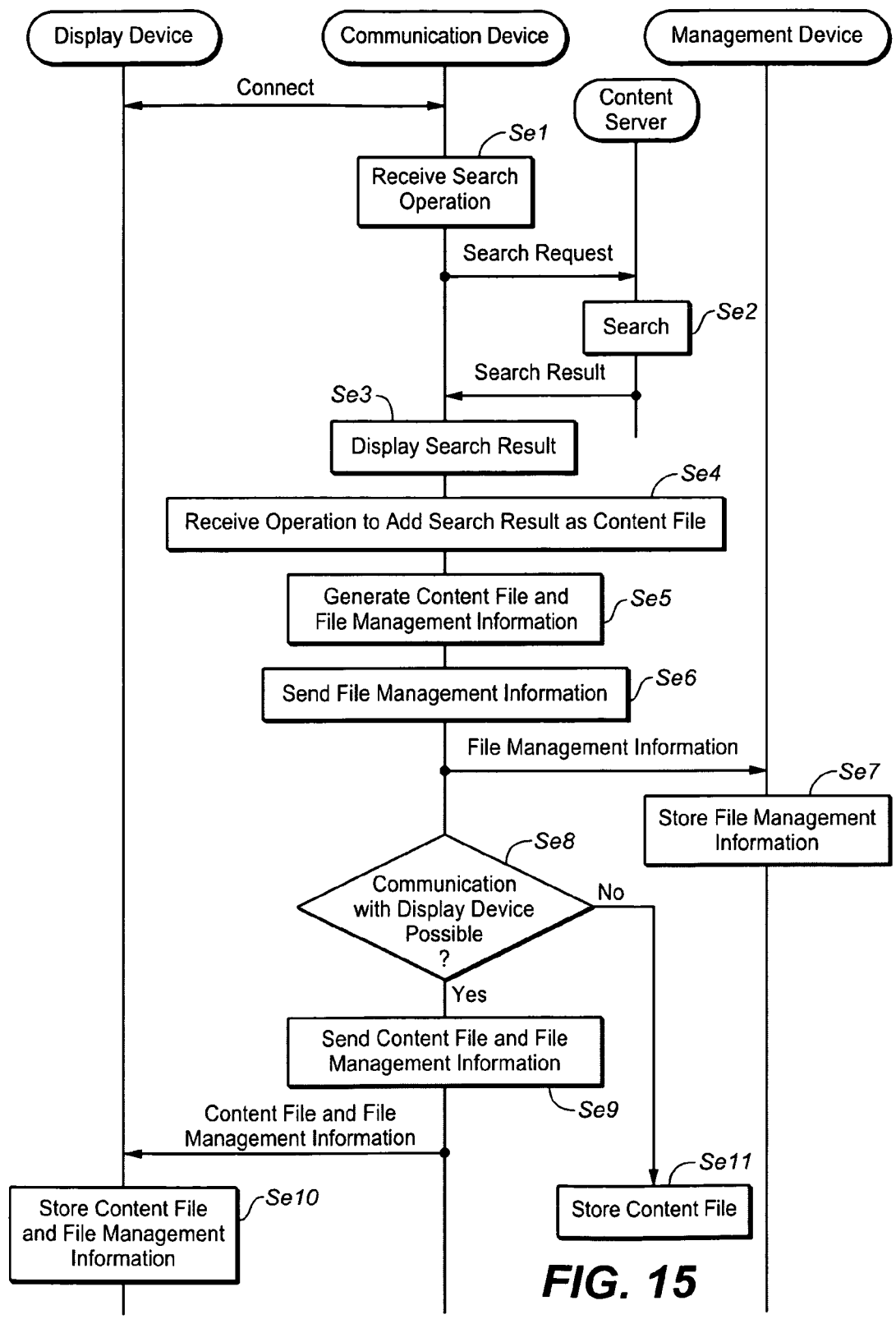
FIG. 15 is a sequence chart showing an example of the operation of an information management system according to the same embodiment.

FIG. 15 is a sequence chart showing the operation of the system according to this third embodiment of the invention.

In FIG. 15, when the communication interface 215 of the display device 21 and the second communication unit 314 of the communication device 31 connect, the control unit 311 of the communication device 31 displays a file list on the display with memory 218 as described in steps Sb1 to step Sb10 in FIG. 9. When the user then uses the operating unit 315 of the communication device 31 to specify a keyword or other search condition and send a search request to the content server 51, the control unit 311 accepts this operation (step Se1). The control unit 311 then sends a search request including the specified search criteria to the content server 51. When the content server 51 receives the search request it searches for content matching the search conditions contained in the search request (step Se2), creates a set including a list of the found content data and identification names identifying the found content data, and sends this set as the search result to the communication device 31. The list of content data identification names is written in HTML, for example.

When the search result is received, the control unit 311 of the communication device 31 stores the search result in the storage unit 312. The control unit 311 then displays a list of the content data identification names contained in the search result on the display unit 316 (step Se3). The user then uses the operating unit 315 to specify a directory and performs an operation to add the search result as a content file in the display system. The control unit 311 recognizes this operation (step Se4), converts the content data identification names and the content data contained in the search result to a data format compatible with the display device 21 (such as PDF or a subset of PDF) and creates separate content files, and generates file management information for each of the content files (step Se5). The control unit 311 links each of the identification names in the content file of identification names to the related content file generated from the content data using a data linking function. The control unit 311 can use a known linking function such as defined in the PDF specification, for example.

The control unit 311 sends the generated file management information from the first communication unit 313 to the management device 11 (step Se6). The control unit 111 of the management device 11 stores the file management information received by the communication unit 113 to the storage unit 112 (step Se7). Next, the control unit 311 of the communication device 31 determines if communication with the display device 21 is possible (step Se8). If communication is possible (step Se8 returns Yes), the control unit 311 of the communication device 31 sends the content file and the file management information to the display device 21 (step Se9). The CPU 211 of the display device 21 stores the content file and file management information received by the communication interface 215 to the flash memory 214 (step Se10).

If in step Se8 communication between the communication device 31 and the display device 21 is not possible (step Se8 returns No), the control unit 311 of the communication device 31 stores the content file in the cache area of the storage unit 312 (step Se11). When the communication device 31 and the display device 21 connect, the content files stored in the cache area of the storage unit 312 are sent from the communication device 31 to the display device 21 and stored to the flash memory 214 of the display device 21 in steps Sb1 to Sb4 in FIG. 9. When the control unit 311 confirms that the content file was sent to the display device 21, the control unit 311 erases the content file from the cache area.

The display device 21 displays the foregoing content file as described below.

The process described in FIG. 7 above starts when the user turns the display device 21 power on. The CPU 211 first displays a file list based on the file management information stored in the flash memory 214 on the display with memory 218 (step Sa1).

Figure 16A:
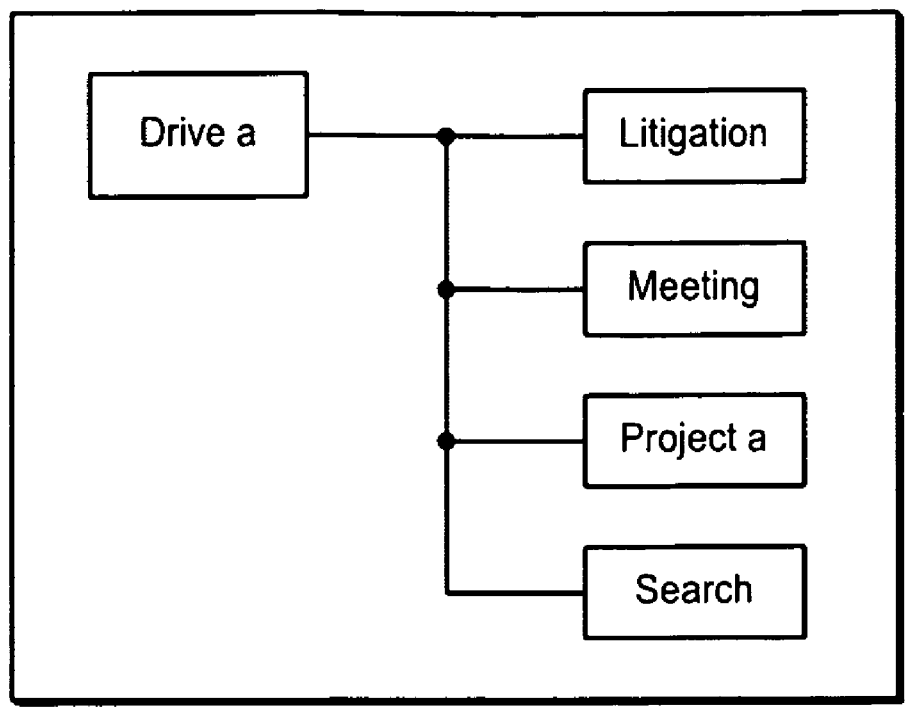
FIG. 16A shows a display sample of a display device according to the same embodiment, and 16B shows a display sample of a display device according to the same embodiment.
Figure 16B:
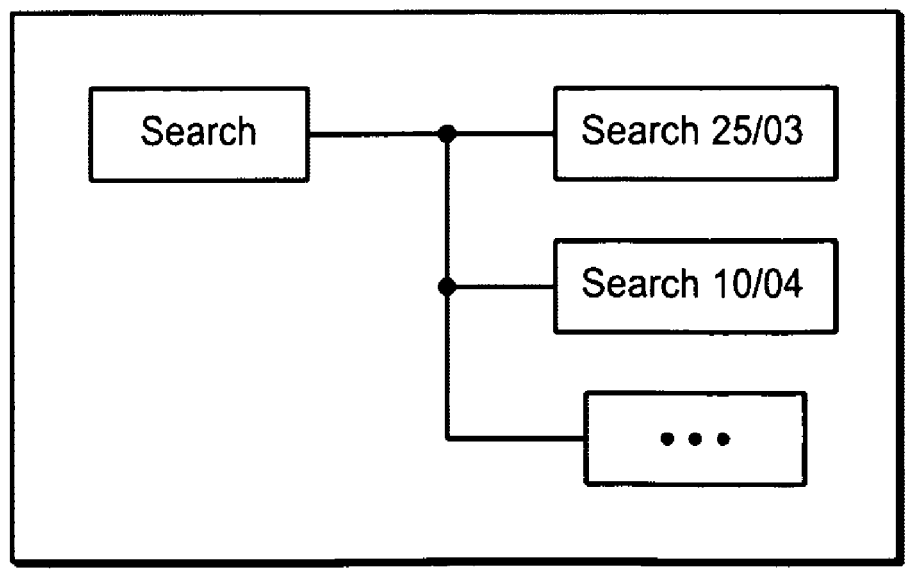

FIG. 16(A) shows an example of a file list displayed on the display with memory 218 at this time. This file list includes a directory named "Search" that is not shown in FIG. 8(A). When the user uses the operating unit 216 to select the Search directory, the CPU 211 determines there was an operation (step Sa2 returns Yes) and evaluates the operation (step Sa3). Because the content of the operation was a command to switch to a file list of the Search directory (step Sa3: Change Directory), the CPU 211 generates and displays on the display with memory 218 a file list of the Search directory based on the file management information stored in the flash memory 214 (step Sa4). A file list such as shown in FIG. 16(B) is thus displayed on the display with memory 218.

If the user uses the operating unit 216 to select the directory named "Search 10/04", the CPU 211 determines there was an operation (step Sa2 returns Yes) and evaluates the operation (step Sa3). Because the content of the operation was to display the content files in the "Search 10/04" directory (step Sa3: Show Content), the CPU 211 reads the specified content files from the flash memory 214 and displays them on the display with memory 218 (step Sa5).

Figure 17:
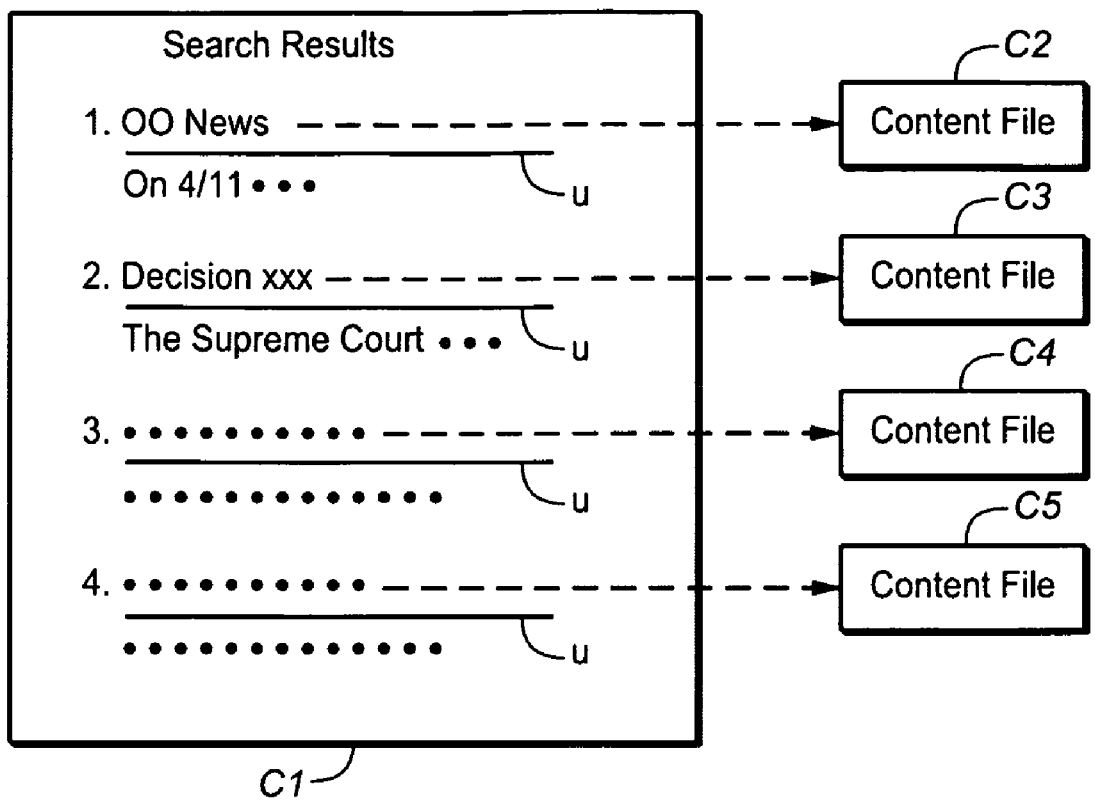
FIG. 17 shows an example of the content displayed by the display device according to the same embodiment.

This results in content C1 showing a list of the identification names of the content files being displayed on the display with memory 218 as shown in FIG. 17. The items marked by an underline u in the content C1 are linked to respective content files. For example, if the user selects the link labelled "OO NEWS" using the operating unit 216, the CPU 211 determines there was an operation (step Sa2 returns Yes) and evaluates the content of the operation (step Sa3). Because the content of the operation was to display the content file linked to "OO NEWS" (step Sa3: Show Content), the CPU 211 reads the content file related by the linking function to this link from the flash memory 214 and displays the content file on the display with memory 218 (step Sa5). As a result, content C2 shown in FIG. 17 is displayed on the display with memory 218. If the user selects any of the other search results marked by an underline u in content C1, the corresponding content C3, C4, or C5 shown in FIG. 17 is displayed on the display with memory 218 in the same way.

This third embodiment of the invention stores a list of identification names for the content located as the search results as a content file containing links, and enables using the identification names contained in the content file as a menu for accessing the individual content files. Furthermore, because the process from searching to conversion to a particular data format is executed by the communication device 31, the display device 21, which has less processor power and power supply capacity, does not need to execute a processor-intensive process. In addition, because the list of content identification names and the content itself is supplied to the display device 21 after being converted to a data format compatible with the display device 21, greater flexibility can be expected in the ability of the display device 21 to handle the search results. More particularly, by using PDF or a subset of PDF, a format that is already widely used, existing development tools can be used and the need for additional development by the developer can be minimized.

The foregoing embodiments of the invention can be modified as described below.

In the first to third embodiments the device that accesses the file management information stored by the management device 11 and changes the file management information is not limited to the communication device 31 of the display system and can be any communication device that can access the management device 11. For example, a computer connected to the management device 11 over a network may be operated by the user to access the file management information stored by the management device 11 and change the file management information.

In the third embodiment the content server that has a function for storing numerous content files and a function for finding and outputting the content files containing the content data meeting specific search conditions is not limited to a device connected to the network 41. The communication device 31 or display device 21 can function as this content server, for example, or content on the Internet can be searched using a common search engine.

In the third embodiment the content data meeting the search criteria specified by the user using the communication device 31 can be found from the content data stored by the content server 51, and the data contained in the search result can be combined and handled as a single content file. That is, the control unit 311 of the communication device 31 combines the content data and the content data identification names into a single merged information file (content file), and a single file management information record is generated for the merged information (content file). The control unit 311 then converts the merged information to a prescribed data format compatible with the display device 21 (such as PDF or a subset of PDF), and sends the merged information in this data format with the file management information to the display device 21. The CPU 211 of the display device 21 stores this merged information as a single content file to the flash memory 214 and stores the file management information to the flash memory 214.

Instead of returning the content data returned by the search in the third embodiment as content files, the search results can be pushed to the communication device 31 using an RSS (RDF Site Summary) feed, for example, so that the content data acquired by the communication device 31 can be handled as content files.

The programs executed by the control unit 111, the CPU 211, and the control unit 311 described above can be provided on a computer readable storage medium such as magnetic tape, magnetic disk, floppy disk, optical recording media, magneto-optical recording media, CD (Compact Disc), DVD (Digital Versatile Disc), or RAM.

In the first to third embodiments described above the display device 21 uses a cholesteric liquid crystal or other type of display with memory 218. However, the display device 21 is not limited to such an arrangement and other known display technologies can be used, including electrophoretic display devices.

What is claimed is:

1. An information management system comprising a plurality of display devices that displays a document, a plurality of communication devices that connect by wire or wirelessly to individual display devices, and a management device that is connected through a network to the individual communication devices, wherein:

the management device includes
a management information storage unit that stores management information that manages a content file including the document,
a first transmission unit for sending the management information stored by the management information storage unit to the communication device,
a management information updating unit that updates the management information stored by the management information storage unit according to a command from the communication device, and
a second transmission unit that sends the management information updated by the management information updating unit according to the command from the communication device through the communication device to the display device;

the communication device includes
an operating unit that receives user operations, and
a control unit that changes the management information sent by the first transmission unit of the management device according to the operations received by the operating unit, and instructing the management device to update the management information according to the changed content; and the display device includes
an information storage unit that relates and stores the content file including the document and the management information that manages the content file,
a display unit that displays the document in the content file stored by the information storage unit,
an updating unit that updates management information stored by the information storage unit based on management information sent by the second transmission unit of the management device,
a management unit that manages the various information stored by the information storage unit using the management information stored by the information storage unit, and
a third transmission unit that sends the management information through the communication device to the management device, wherein the content file is not sent through the communication device to the management device,
wherein the display device including the information storage unit is separated from the communication device,
wherein the display device is connected to the management device through the communication device,
wherein the management information contains hierarchical relationship information representing a hierarchical relationship between various content files, and the display unit of the display device displays a first identification name assigned to the content file corresponding to the various management information according to the hierarchical relationship described by the hierarchical relationship information contained in the various management information, and wherein the management information contains metadata for the content file, and the display unit of the display device displays a second identification name that is grouped according to the content files correlated to the management information containing common metadata and is assigned to the content file.

2. The information management system described in claim 1, wherein:
the metadata contains additional information that is added to the information; and
the display unit of the display device
displays identification names that are grouped according to the information correlated to the management information containing common additional information and are assigned to the information.

3. The information management system described in claim 1, wherein:
the communication device includes
an information display unit that gets and displays the information stored by the information storage unit of the display device,
a generating unit that changes information displayed by the information display unit according to operations received by the operating unit and generates the management information according to the changed information content,
a management information transmission unit that sends the management information generated by the generating unit to the management device, and instructs the management device to update the content of the transmitted management information, and
an information transmission unit that sends the information with changed content the management information generated by the generating unit to the display device when communication with the display device is possible, and
stores the information with changed content and the management information generated by the generating unit when communication with the display device is not possible, and then sends the stored information and management information to the display device when communication with the display device later becomes possible; and
the updating unit of the display device
updates information and management information stored by the information storage unit based on information and management information sent by the information transmission unit of the communication device.

4. The information management system described in claim 1, wherein:
the display device includes
a management information transmission unit that sends the management information stored by the information storage unit through the communication device to the management device when connected to the communication device; and
the management device includes
an identification unit that compares management information sent from the management information transmission unit of the display device and the management information stored by the management information storage unit, and identifies differences in the information, and
a third transmission unit that sends the differences identified by the identification unit through the communication device to the display device; and the updating unit of the display device updates management information stored by the information storage unit based on the differences sent by the third transmission unit of the management device.

5. The information management system described in claim 1, further comprising:
a control device that commands the management device to update content of the management information stored by the management information storage unit of the management device;
wherein the management information updating unit of the management device
updates the management information stored in the management information storage unit according to a command from the control device, and
the second transmission unit of the management device sends the management information updated by the management information updating unit according to the command from the control device through the communication device to the display device.

6. The information management system described in claim 1, wherein:
the display device and the management device each store a first key for encrypting the management information that is transferred between the display device and the management device;
the display device stores a second key for encrypting the information and the management information that is transferred between the display device and the communication device;
the management information is encrypted or the encrypted management information is decrypted using the first key stored by the display device and the management device when the management information is transferred between the display device and the management device; and
when the information or the management information is transferred between the display device and the communication device,
the display device sends the stored second key to the communication device before the transfer,
the information or the management information is encrypted, or the encrypted information or management information is decrypted, using the second key stored by both the display device and the communication device after the display device and the communication device have each stored the second key, and
the communication device deletes the stored second key after encryption or decryption by the communication device is completed.

7. The information management system described in claim 6, wherein:
the display device and the management device store a different first key for each user that uses the display device.

8. The information management system described in claim 1, wherein:
the communication device includes
an acquisition unit that acquires various information and identification names identifying the various information,
a management information generating unit that generates management information for the various information acquired by the acquisition unit, and
an information transmission unit that relates and sends to the display device the management information generated by the management information generating unit and the identification names and the information acquired by the acquisition unit;
the display device includes
a storage control unit that receives, relates, and stores in the information storage unit the various identification names, the various information, and the various management information sent by the information transmission unit of the communication device; and
the display unit of the display device
displays the identification names stored by the information storage unit, and
when a displayed identification name is specified by an operation received by the operating unit, displays the information that is linked to the identification name and stored by the information storage unit.

9. The information management system described in claim 8, wherein:
the communication device includes
a conversion unit that converts the information and the identification names to a prescribed data format compatible with the display device; and
the information transmission unit sends the information and the identification names after data format conversion by the conversion unit to the display device.

10. The information management system described in claim 8, wherein:
the acquisition unit acquires the information and the identification names as a search result based on search conditions specified by an operation received by the operating unit.

11. The information management system described in claim 1, wherein:
the communication device includes
an acquisition unit that acquires various information and identification names identifying the various information,
a management information generating unit that merges the information and identification names acquired by the acquisition unit into a single unit of merged information, and generating management information for the merged information, and
an information transmission unit that relates and sends to the display device the merged information that was merged by the management information generating unit and the management information generated by the management information generating unit;
the display device includes
a storage control unit that receives, relates, and stores in the information storage unit the merged information and the management information sent by the information transmission unit of the communication device; and
the display unit of the display device
displays the identification names contained in the merged information stored by the information storage unit, and
when a displayed identification name is specified by an operation received by the operating unit, displays the information that is identified by the specified identification name in the information contained in the merged information.

12. The information management system described in claim 11, wherein:
the communication device includes
a conversion unit that converts the merged information to a prescribed data format compatible with the display device; and
the information transmission unit sends the merged information after data format conversion by the conversion unit to the display device.

13. A display system comprising a display device that displays a document, and a communication device that can connect by wire or wirelessly to the display device, wherein:
the communication device includes
an operating unit that receives user operations; and
a control unit that changes management information sent from an external management device according to an operation received by the operating unit, and instructs the management device to update the management information to the changed content; and
the display device includes
an information storage unit that relates and stores a content file including the document and the management information that manages the content file,
a display unit that displays the document included in the content file stored by the information storage unit,
an updating unit that updates management information stored by the information storage unit based on management information sent from the management device,
a management unit that manages the various information using the management information stored by the information storage unit, and
a transmission unit that sends the management information through the communication device to the management device,
wherein the content file is not sent through the communication device to the management device,
wherein the display device including the information storage unit is separated from the communication device,
wherein the display device is connected to the management device through the communication device,
wherein the management information contains hierarchical relationship information representing a hierarchical relationship between various content files, and the display unit of the display device displays a first identification name assigned to the content file corresponding to the various management information according to the hierarchical relationship described by the hierarchical relationship information contained in the various management information, and
wherein the management information contains metadata for the content file, and the display unit of the display device displays a second identification name that is grouped according to the content files correlated to the management information containing common metadata and is assigned to the content file.

14. The information management system described in claim 13, wherein:
the metadata contains additional information that is added to the information; and
the display unit of the display device
displays identification names that are grouped according to the information correlated to the management information containing common additional information and are assigned to the information.

* * * * *